US008913000B2

(12) United States Patent
Erol et al.

(10) Patent No.: US 8,913,000 B2
(45) Date of Patent: Dec. 16, 2014

(54) VIDEO PLAYBACK ON ELECTRONIC PAPER DISPLAYS

(75) Inventors: Berna Erol, San Jose, CA (US); John W. Barrus, Menlo Park, CA (US); Guotong Feng, Mountain View, CA (US)

(73) Assignee: Ricoh Co., Ltd., Tokyo (JP)

( * ) Notice: Subject to any disclaimer, the term of this patent is extended or adjusted under 35 U.S.C. 154(b) by 1159 days.

(21) Appl. No.: 12/415,899

(22) Filed: Mar. 31, 2009

(65) Prior Publication Data

US 2009/0219264 A1 Sep. 3, 2009

Related U.S. Application Data

(63) Continuation-in-part of application No. 12/059,118, filed on Mar. 31, 2008.

(60) Provisional application No. 60/944,415, filed on Jun. 15, 2007.

(51) Int. Cl.

| | |
|---|---|
| ***G09G 3/34*** | (2006.01) |
| ***G09G 3/20*** | (2006.01) |
| *G09G 5/36* | (2006.01) |
| *G02F 1/167* | (2006.01) |

(52) U.S. Cl.

CPC .......... *G09G 3/2092* (2013.01); *G09G 2360/12* (2013.01); *G09G 2320/0252* (2013.01); *G09G 3/344* (2013.01); *G09G 5/363* (2013.01); *G09G 3/2011* (2013.01); *G09G 2320/0257* (2013.01); *G09G 2320/0261* (2013.01); *G09G 2340/16* (2013.01); *G09G 2340/0407* (2013.01); *G09G 2320/0271* (2013.01); *G02F 2001/1676* (2013.01); *G09G 2380/02* (2013.01)

USPC ............................ 345/107; 345/204; 345/589

(58) Field of Classification Search

USPC .................................................. 345/204, 107

See application file for complete search history.

(56) References Cited

U.S. PATENT DOCUMENTS 4,065,770 A 12/1977 Berry
4,930,875 A 6/1990 Inoue et al.

(Continued)

FOREIGN PATENT DOCUMENTS

CN 1519620 8/2004
CN 1577471 2/2005

(Continued)

OTHER PUBLICATIONS

Extended European Search Report, European Patent Application No. EP08777423, Jun. 7, 2011, 12 pages.

(Continued)

*Primary Examiner* — Sumati Lefkowitz
*Assistant Examiner* — Jose Soto Lopez
(74) *Attorney, Agent, or Firm* — Patent Law Works LLP

(57) ABSTRACT

A system for displaying video on electronic paper displays to reduce video playback artifacts comprises an electronic paper display, a video display driver, a video transcoder, a display controller, a memory buffer and a waveforms module. The video display driver receives a re-formatted video stream, which has been processed by the video transcoder, from the memory buffer. The video display driver directs the video transcoder to process the video stream and generate pixel data. The video display driver loads waveforms into the frame buffer and updates display commands repeatedly to activate the display controller until the end of the video playback. The video display driver directs copying video frames sequentially one by one from the memory buffer to the frame buffer in real time during the video playback. The video transcoder receives a video stream for presentation on the electronic paper display and processes the video stream generating pixel data that is provided to the display controller. The present invention also includes a method for displaying video on an electronic paper display.

20 Claims, 14 Drawing Sheets

(56) References Cited

U.S. PATENT DOCUMENTS

| | | | |
|---|---|---|---|
| 5,029,257 | A | 7/1991 | Kim |
| 5,122,791 | A | 6/1992 | Gibbons |
| 5,509,085 | A | 4/1996 | Kakutani |
| 5,608,420 | A | 3/1997 | Okada |
| 5,703,621 | A | 12/1997 | Martin et al. |
| 5,754,156 | A | 5/1998 | Erhart et al. |
| 5,815,134 | A | 9/1998 | Nishi |
| 5,963,714 | A | 10/1999 | Bhattacharjya et al. |
| 6,067,185 | A | 5/2000 | Albert et al. |
| 6,147,671 | A | 11/2000 | Agarwal |
| 6,243,063 | B1 | 6/2001 | Mayhew et al. |
| 6,285,774 | B1 | 9/2001 | Schumann et al. |
| 6,327,017 | B2 | 12/2001 | Barberi et al. |
| 6,377,249 | B1 | 4/2002 | Mumford |
| 6,504,524 | B1 | 1/2003 | Gates et al. |
| 6,563,957 | B1 | 5/2003 | Li et al. |
| 6,738,039 | B2 | 5/2004 | Goden |
| 6,791,716 | B1 | 9/2004 | Buhr et al. |
| 6,804,191 | B2 | 10/2004 | Richardson |
| 6,850,217 | B2 | 2/2005 | Huang et al. |
| 6,864,875 | B2 | 3/2005 | Drzaic et al. |
| 6,901,164 | B2 | 5/2005 | Sheffer |
| 7,012,600 | B2 | 3/2006 | Zehner et al. |
| 7,075,502 | B1 | 7/2006 | Drzaic et al. |
| 7,109,967 | B2 | 9/2006 | Hioki et al. |
| 7,119,772 | B2 | 10/2006 | Amundson et al. |
| 7,154,452 | B2 | 12/2006 | Nakamura et al. |
| 7,200,242 | B2 | 4/2007 | Murakami |
| 7,227,519 | B1 | 6/2007 | Kawase et al. |
| 7,280,103 | B2 | 10/2007 | Taoka et al. |
| 7,372,594 | B1 | 5/2008 | Kusakabe et al. |
| 7,456,808 | B1 | 11/2008 | Wedding et al. |
| 7,528,848 | B2 | 5/2009 | Xu et al. |
| 7,528,882 | B2 | 5/2009 | Saori et al. |
| 7,733,311 | B2 | 6/2010 | Amundson et al. |
| 7,804,483 | B2 | 9/2010 | Zhou et al. |
| 2002/0036616 | A1 | 3/2002 | Inoue |
| 2003/0020701 | A1 | 1/2003 | Nakamura et al. |
| 2003/0063575 | A1 | 4/2003 | Kinjo |
| 2003/0095094 | A1 | 5/2003 | Goden |
| 2003/0137521 | A1* | 7/2003 | Zehner et al. ................. 345/589 |
| 2003/0227441 | A1 | 12/2003 | Hioki et al. |
| 2003/0231158 | A1* | 12/2003 | Someya et al. ............... 345/101 |
| 2004/0002023 | A1 | 1/2004 | Sowinski |
| 2004/0028256 | A1 | 2/2004 | Murakami |
| 2004/0165115 | A9 | 8/2004 | Daly |
| 2005/0013501 | A1 | 1/2005 | Kang et al. |
| 2005/0116924 | A1 | 6/2005 | Sauvante et al. |
| 2005/0174591 | A1 | 8/2005 | Sowinski et al. |
| 2005/0179642 | A1 | 8/2005 | Wilcox et al. |
| 2005/0212747 | A1 | 9/2005 | Amundson |
| 2005/0219184 | A1 | 10/2005 | Zehner et al. |
| 2005/0248575 | A1 | 11/2005 | Chou et al. |
| 2005/0280626 | A1 | 12/2005 | Amundson et al. |
| 2005/0281334 | A1 | 12/2005 | Walker et al. |
| 2006/0055713 | A1 | 3/2006 | Asao et al. |
| 2006/0066503 | A1 | 3/2006 | Sampsell et al. |
| 2006/0066595 | A1 | 3/2006 | Sampsell et al. |
| 2006/0112382 | A1 | 5/2006 | Glass et al. |
| 2006/0164405 | A1 | 7/2006 | Zhou |
| 2006/0169980 | A1* | 8/2006 | Morita et al. ................... 257/59 |
| 2006/0170648 | A1 | 8/2006 | Zhou et al. |
| 2007/0002009 | A1 | 1/2007 | Pasch et al. |
| 2007/0013627 | A1 | 1/2007 | Hsieh et al. |
| 2007/0035510 | A1 | 2/2007 | Zhou et al. |
| 2007/0052667 | A1 | 3/2007 | Zhou et al. |
| 2007/0057905 | A1 | 3/2007 | Johnson et al. |
| 2007/0057906 | A1 | 3/2007 | Johnson et al. |
| 2007/0075949 | A1 | 4/2007 | Lu et al. |
| 2007/0085819 | A1 | 4/2007 | Zhou et al. |
| 2007/0139399 | A1 | 6/2007 | Cook |
| 2007/0140351 | A1 | 6/2007 | Ho |
| 2007/0176912 | A1 | 8/2007 | Beames et al. |
| 2007/0206262 | A1 | 9/2007 | Zhou |
| 2008/0068291 | A1 | 3/2008 | Yuan et al. |
| 2008/0084600 | A1 | 4/2008 | Bita et al. |
| 2008/0111778 | A1 | 5/2008 | Shen et al. |
| 2008/0135412 | A1 | 6/2008 | Cortenraad et al. |
| 2008/0143691 | A1 | 6/2008 | Cook |
| 2008/0198098 | A1 | 8/2008 | Gelbman et al. |
| 2008/0291129 | A1 | 11/2008 | Harris et al. |
| 2010/0026930 | A1 | 2/2010 | Jepsen |
| 2011/0285754 | A1 | 11/2011 | Harrington et al. |

FOREIGN PATENT DOCUMENTS

| | | | |
|---|---|---|---|
| CN | 1589462 | | 3/2005 |
| JP | 02-136915 | A | 5/1990 |
| JP | 2003-256134 | A | 9/2003 |
| JP | 2006-243364 | A | 9/2006 |
| JP | 2006243364 | | 9/2006 |
| JP | 2007-102042 | A | 4/2007 |
| JP | 2007-241405 | A | 9/2007 |
| TW | 200504442 | | 2/2005 |
| WO | WO 03/044765 | A2 | 5/2003 |
| WO | WO 2004/034366 | A1 | 4/2004 |
| WO | 2005006296 | | 1/2005 |
| WO | WO 2005/027087 | A1 | 3/2005 |
| WO | 2005054933 | | 6/2005 |
| WO | 2005055187 | | 6/2005 |
| WO | WO 2005/078692 | A1 | 8/2005 |
| WO | WO 2005/086131 | A1 | 9/2005 |
| WO | 2005101362 | | 10/2005 |
| WO | WO 2005/093705 | A1 | 10/2005 |
| WO | WO 2005/096259 | A1 | 10/2005 |
| WO | WO 2005/101362 | A1 | 10/2005 |
| WO | WO 2006/013502 | A1 | 2/2006 |
| WO | 2006090315 | | 8/2006 |
| WO | WO 2007/099829 | A1 | 9/2007 |

OTHER PUBLICATIONS

Chinese Office Action, Chinese Application No. 200880000725.3, Jun. 29, 2011, 9 pages.

United States Office Action, U.S. Appl. No. 12/059,091, Jul. 27, 2011, 24 pages.

United States Office Action, U.S. Appl. No. 12/059,441, Aug. 12, 2011, 12 pages.

Whitesides et al., "10.2: Towards Video-rate Microencapsulated Dual-Particle Electrophoretic Displays", 2004 SID International Symposium, Seattle, WA, May 25-27, 2004; [SID International Symposium], San Jose, CA, SID, US, vol. XXXV, May 25, 2004, pp. 133-135.

Johnson et al., "56.1: Invited Paper: High Quality Images on Electronic Paper Displays", 2005 SID International Symposium, Boston, MA, May 24-27, 2005 [SID International Symposium], San Jose, CA, SID, US, vol. XXXVI, May 24, 2005, pp. 1666-1669.

Extended European Search Report, Application No. 08765766.4, Feb. 9, 2011, 6 pages.

Extended European Search Report, Application 08765765.6, Mar. 10, 2011, 10 pages.

Extended European Search Report, Application No. 08777421.2, Apr. 15, 2011, 9 pages.

U.S. Office Action, U.S. Appl. No. 12/059,091, Mar. 15, 2011, 17 pages.

U.S. Office Action, U.S. Appl. No. 12/059,118, Apr. 20, 2011, 28 pages.

Chinese Office Action, Chinese Patent Application No. 200880000556.3, Apr. 8, 2011, 9 pages.

U.S. Office Action, U.S. Appl. No. 12/059,441, Apr. 20, 2011, 11 pages.

U.S. Office Action, U.S. Appl. No. 12/059,399, May 2, 2011, 29 pages.

U.S. Office Action, U.S. Appl. No. 12/059,085, May 13, 2011, 13 pages.

Bresenham, J.E., *Algorithm for Computer Control of a Digital Plotter,* IBM Systems Journal, 1965, pp. 25-30, vol. 4, No. 1.

(56) References Cited

OTHER PUBLICATIONS

Crowley, J.M. et al., *Dipole Moments of Gyricon Balls,* Electrostatics Fundamentals. Applications and Hazards, Selected Papers from the Fourth IEJ-ESA Joint Symposium on Electrostatics, Sep. 25-26, 2000, pp. 247-259, vol. 55, No. 3-4.

PCT International Search Report and Written Opinion, PCT/JP2008/061277, Aug. 19, 2008, 11 pages.

PCT International Search Report and Written Opinion, PCT/JP2008/061273, Sep. 16, 2008, 11 pages.

PCT International Search Report and Written Opinion, PCT/JP2008/061272, Sep. 30, 2008, 10 pages.

PCT International Search Report and Written Opinion, PCT/JP2008/061271, Sep. 30, 2008, 11 pages.

PCT International Search Report and Written Opinion, PCT/JP2008/061278, Oct. 7, 2008, 11 pages.

Zehner, R. et al., *Drive Waveforms for Active Matrix Electrophoretic Displays,* May 2003, pp. 842-845, vol. XXXIV, Book II.

Japanese Office Action, Japanese Patent Application No. 2009-506841, Dec. 6, 2011, 2 pages.

Chinese Office Action, Chinese Application No. 200880000556.3, Aug. 1, 2011, 10 pages.

United States Office Action, U.S. Appl. No. 12/059,118, Sep. 14, 2011, 54 pages.

United States Office Action, U.S. Appl. No. 12/059,399, Sep. 15, 2011, 44 pages.

United States Office Action, U.S. Appl. No. 12/059,091, Oct. 19, 2011, 32 pages.

U.S. Office Action, U.S. Appl. No. 12/059,085, Nov. 14, 2011, 21 pages.

U.S. Office Action, U.S. Appl. No. 121059,441, Dec. 2, 2011, 29 pages.

U.S. Office Action, U.S. Appl. No. 12/059,118, Jan. 11, 2012, 23 pages.

U.S. Office Action, U.S. Appl. No. 12/059,399, Jan. 20, 2012, 54 pages.

JP Office Action, JP Patent Application No. 097122474, Feb. 23, 2012, 10 pgs.

U.S. Notice of Allowance, U.S. Appl. No. 12/059,118, Apr. 9, 2012; 19 pages.

* cited by examiner

VIDEO PLAYBACK ON ELECTRONIC PAPER DISPLAYS

CROSS REFERENCE TO RELATED APPLICATIONS

This application is a continuation-in-part of U.S. patent application Ser. No. 12/059,118, filed Mar. 31, 2008, entitled "Video Playback on Electronic Paper Displays", which claims priority under 35 U.S.C. §119(e) from U.S. Provisional Patent Application No. 60/944,415, filed Jun. 15, 2007, entitled "Systems and Methods for Improving the Display Characteristics of Electronic Paper Displays," the entire contents of which are hereby incorporated by reference in their entireties.

BACKGROUND OF THE INVENTION

1. Field of the Invention

The present invention generally relates to the field of electronic paper displays. More particularly, the invention relates to displaying video on electronic paper displays.

2. Description of the Background Art

Several technologies have been introduced recently that provide some of the properties of paper in a display that can be updated electronically. Some of the desirable properties of paper that this type of display tries to achieve include: low power consumption flexibility, wide viewing angle, low cost, light weight, high resolution, high contrast and readability indoors and outdoors. Because these displays attempt to mimic the characteristics of paper, these displays are referred to as electronic paper displays (EPDs) in this application. Other names for this type of display include: paper-like displays, zero power displays, e-paper, bi-stable displays and electrophoretic displays.

A comparison of EPDs to Cathode Ray Tube (CRT) displays or Liquid Crystal Displays (LCDs) reveals that in general, EPDs require much less power and have higher spatial resolution, but have the disadvantages of slower update rates, less accurate gray level control, and lower color resolution. Many electronic paper displays are currently only grayscale devices. Color devices are becoming available often through the addition of a color filter, which tends to reduce the spatial resolution and the contrast.

Electronic Paper Displays are typically reflective rather than transmissive. Thus they are able to use ambient light rather than requiring a lighting source in the device. This allows EPDs to maintain an image without using power. They are sometimes referred to as "bi-stable" because black or white pixels can be displayed continuously, and power is only needed when changing from one state to another. However, many EPD devices are stable at multiple states and thus support multiple gray levels without power consumption.

One type of EPD called a microencapsulated electrophoretic (MEP) display moves hundreds of particles through a viscous fluid to update a single pixel. The viscous fluid limits the movement of the particles when no electric field is applied and gives the EPD its property of being able to retain an image without power. This fluid also restricts the particle movement when an electric field is applied and causes the display to be very slow to update compared to other types of displays.

While electronic paper displays have many benefits there are a number of problems when displaying video: (1) slow update speed (also called update latency); (2) accumulated error; and (3) visibility of previously displayed images (e.g., ghosting).

The first problem is that most EPD technologies require a relatively long time to update the image as compared with conventional CRT or LCD displays. A typical LCD takes approximately 5 milliseconds to change to the correct value, supporting frame rates of up to 200 frames per second (the achievable frame rate is typically limited by the ability of the display driver electronics to modify all the pixels in the display). In contrast, many electronic paper displays, e.g. the E Ink displays, take on the order of 300-1000 milliseconds to change a pixel value from white to black. While this update time is generally sufficient for the page turning needed by electronic books, it is a significant problem for interactive applications with user interfaces and the display of video.

When displaying a video or animation, each pixel should ideally be at the desired reflectance for the duration of the video frame, i.e. until the next requested reflectance is received. However, every display exhibits some latency between the request for a particular reflectance and the time when that reflectance is achieved. If a video is running at 10 frames per second (which is already reduced since typical video frame rates for movies are 30 frames a second) and the time required to change a pixel is 10 milliseconds, the pixel will display the correct reflectance for 90 milliseconds and the effect will be as desired. If it takes 100 milliseconds to change the pixel, it will be time to change the pixel to another reflectance just as the pixel achieves the correct reflectance of the prior frame. Finally, if it takes 200 milliseconds for the pixel to change, the pixel will never have the correct reflectance except in the circumstance where the pixel was very near the correct reflectance already, i.e. slowly changing imagery. Thus, EPDs have not been used to display video.

The second problem is accumulated error. As different values are applied to drive different pixels to different optical output levels, errors are introduced depending on the particular signals or waveforms applied to the pixel to move it from one particular optical state to another. This error tends to accumulate over time. A typical prior are solution would be to drive all the pixels to black, then to white, then back to black. However, with video this cannot be done because there isn't time with 10 or more frames per second, and since there are many more transitions in optical state for video, this error accumulates to the point where it is visible in the video images produced by the EPD.

The third problem is related to update latency in that often there are not enough frames to set some pixels to their desired gray level. This produces visible video artifacts during playback, particularly in the high motion video segments. Similarly, there is not enough contrast in the optical image produced by the EPD because there is not time between frames to drive the pixels to the proper optical state where there is contrast between pixels. This also relates to the characteristics of EPD where near the ends of the pixel values, black and white, the displays require more time to transition between optical states, e.g., different gray levels.

SUMMARY OF THE INVENTION

The present invention overcomes the deficiencies and limitations of the prior art by providing a system and method for displaying video on electronic paper displays. In particular, the system and method of the present invention reduce video playback artifacts on electronic paper displays. A system for displaying video on electronic paper displays to reduce video playback artifacts comprises an electronic paper display, a video display driver, a video transcoder, a display controller, a memory buffer and a waveforms module. The video display driver receives a re-formatted video stream, which has been processed by the video transcoder, from the memory buffer. The video display driver directs the video transcoder to process the video stream and generate pixel data. The video display driver also directs the loading of waveforms into the frame buffer and the repeated updating of display commands to activate the display controller until the end of the video playback process. The video transcoder receives a video stream for presentation on the electronic paper display and processes the video stream generating pixel data that is provided to the display controller. The present invention also includes a method for displaying video on an electronic paper display.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
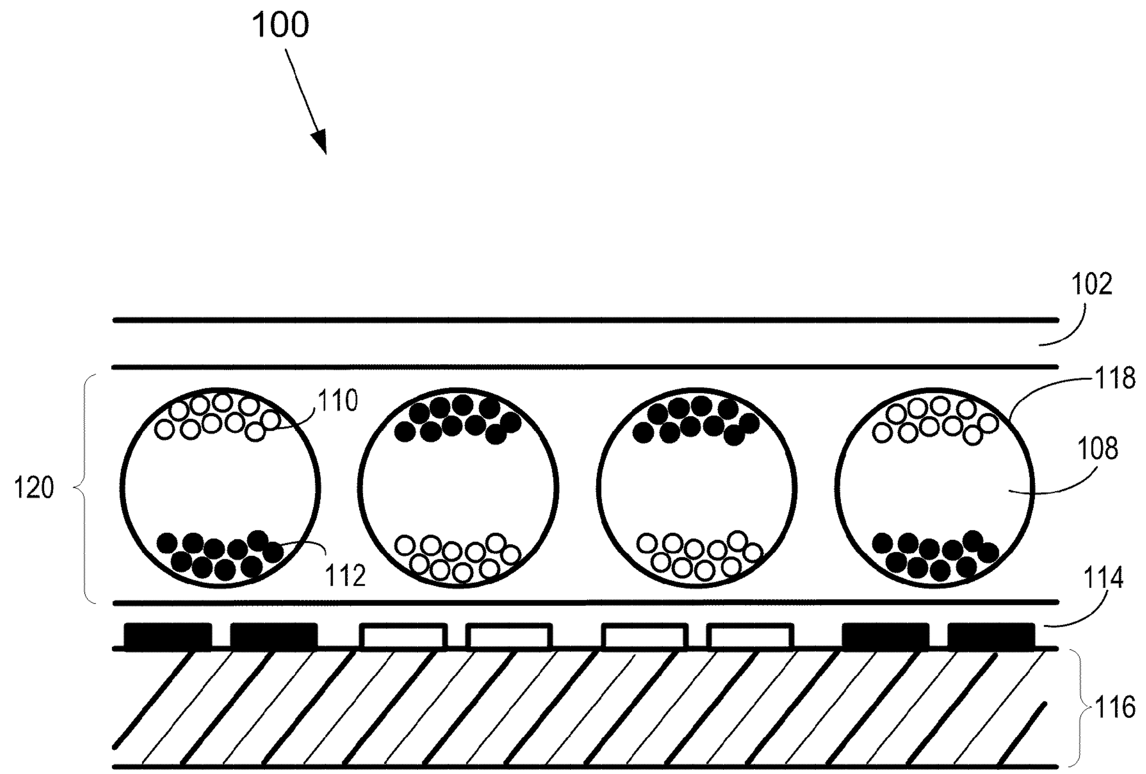
FIG. 1 illustrates a cross-sectional view of a portion of an example electronic paper display in accordance with an embodiment of the present invention.

A system and method for displaying video on electronic paper displays is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. It should be noted that from the following discussion, alternative embodiments of the structures and methods disclosed herein will be readily recognized as viable alternatives that may be employed without departing from the principles of what is claimed. For example, the present invention is described below in the context of gray scale and electrophoretic displays, however, those skilled in the art will recognize that the principles of the present invention are applicable to any bi-stable display or color sequences.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Device Overview

FIG. 1 illustrates a cross-sectional view of a portion of an exemplary electronic paper display 100 in accordance with some embodiments. The components of the electronic paper display 100 are sandwiched between a top transparent electrode 102 and a bottom backplane 116. The top transparent electrode 102 is a thin layer of transparent material. The top transparent electrode 102 allows for viewing of microcapsules 118 of the electronic paper display 100.

Directly beneath the transparent electrode 102 is the microcapsule layer 120. In one embodiment, the microcapsule layer 120 includes closely packed microcapsules 118 having a clear liquid 108 and some black particles 112 and white particles 110. In some embodiments, the microcapsule 118 includes positively charged white particles 110 and negatively charged black particles 112. In other embodiments, the microcapsule 118 includes positively charged black particles 112 and negatively charged white particles 110. In yet other embodiments, the microcapsule 118 may include colored particles of one polarity and different colored particles of the opposite polarity. In some embodiments, the top transparent electrode 102 includes a transparent conductive material such as indium tin oxide.

Disposed below the microcapsule layer 120 is a lower electrode layer 114. The lower electrode layer 114 is a network of electrodes used to drive the microcapsules 118 to a desired optical state. The network of electrodes is connected to display circuitry, which turns the electronic paper display "on" and "off" at specific pixels by applying a voltage to specific electrodes. Applying a negative charge to the electrode repels the negatively charged particles 112 to the top of microcapsule 118, forcing the positively charged white particles 110 to the bottom and giving the pixel a black appearance. Reversing the voltage has the opposite effect—the positively charged white particles 112 are forced to the surface, giving the pixel a white appearance. The reflectance (brightness) of a pixel in an EPD 100 changes as voltage is applied. The amount the pixel's reflectance changes may depend on both the amount of voltage and the length of time for which it is applied, with zero voltage leaving the pixel's reflectance unchanged.

The electrophoretic microcapsules of the layer 120 may be individually activated to a desired optical state, such as black, white or gray. In some embodiments, the desired optical state may be any other prescribed color. Each pixel in layer 114 may be associated with one or more microcapsules 118 contained with a microcapsule layer 120. Each microcapsule 118 includes a plurality of tiny particles 110 and 112 that are suspended in a clear liquid 108. In some embodiments, the plurality of tiny particles 110 and 112 are suspended in a clear liquid polymer.

The lower electrode layer 114 is disposed on top of a backplane 116. In one embodiment, the electrode layer 114 is integral with the backplane layer 116. The backplane 116 is a plastic or ceramic backing layer. In other embodiments, the backplane 116 is a metal or glass backing layer. The electrode layer 114 includes an array of addressable pixel electrodes and supporting electronics.

Figure 2:
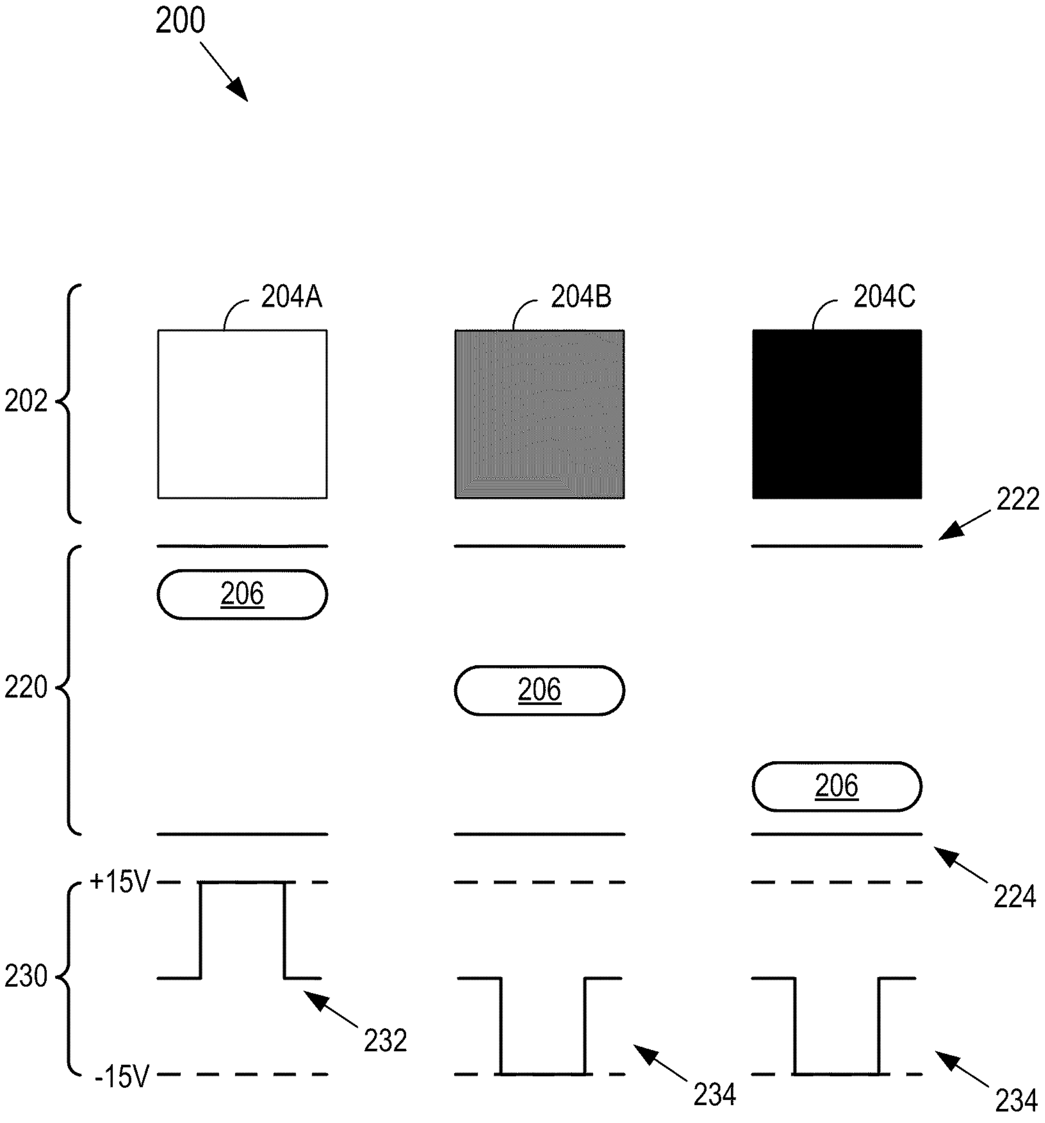
FIG. 2 is illustrates a model of a typical electronic paper display in accordance with one embodiment of the present invention.

FIG. 2 illustrates a model 200 of a typical electronic paper display in accordance with some embodiments. The model 200 shows three parts of an electronic paper display 100: a reflectance image 202; a physical media 220 and a control signal 230. To the end user, the most important part is the reflectance image 202, which is the amount of light reflected at each pixel of the display. High reflectance leads to white pixels as shown on the left 204A, and low reflectance leads to black pixels as shown on the right 204C. Some electronic paper displays are able to maintain intermediate values of reflectance leading to gray pixels, shown in the middle 204B.

Electronic paper displays have some physical media capability of maintaining a state. In the physical media 220 of electrophoretic displays, the state is the position of a particle or particles 206 in a fluid, e.g. a white particle in a dark fluid. In other embodiments that use other types of displays, the state might be determined by the relative position of two fluids, or by rotation of a particle or by the orientation of some structure. In FIG. 2, the state is represented by the position of the particle 206. If the particle 206 is near the top 222, white state, of the physical media 220 the reflectance is high, and the pixels are perceived as white. If the particle 206 is near the bottom 224, black state, of the physical media 220, the reflectance is low and the pixels are perceived as black.

Regardless of the exact device, for zero power consumption, it is necessary that this state can be maintained without any power. Thus, the control signal 230 as shown in FIG. 2 must be viewed as the signal that was applied in order for the physical media to reach the indicated position. Therefore, a control signal with a positive voltage 232 is applied to drive the white particles toward the top 222, white state, and a control signal with a negative voltage 234 is applied to drive the black particles toward the top 222, black state.

The reflectance of a pixel in an EPD changes as voltage is applied. The amount the pixel's reflectance changes may depend on both the amount of voltage and the length of time for which it is applied, with zero voltage leaving the pixel's reflectance unchanged.

System Overview

Figure 3A:
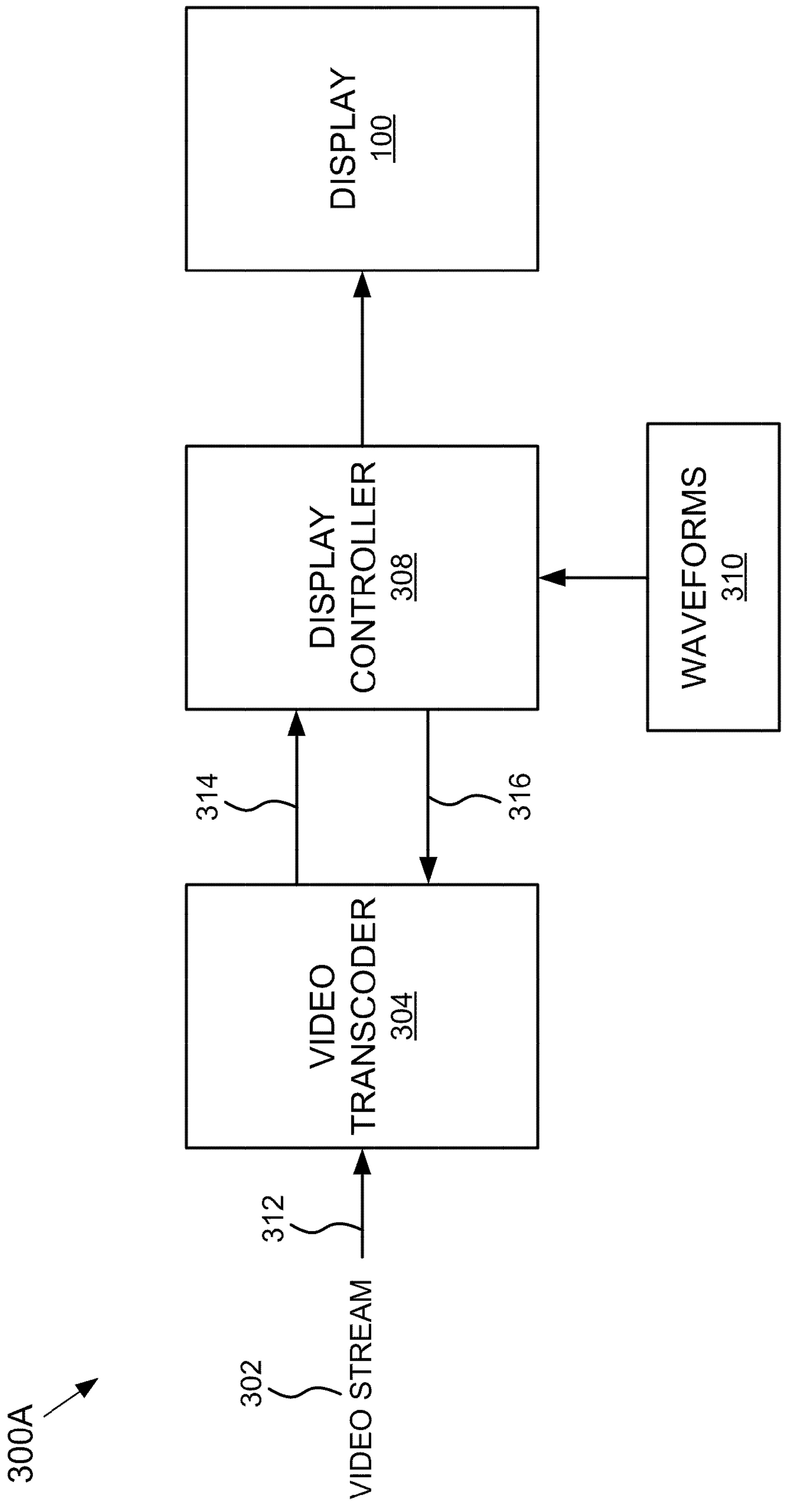
FIG. 3A shows a block diagram of a control system of the electronic paper display in accordance with one embodiment of the present invention.

FIG. 3A illustrates a block diagram of a control system 300A of the electronic paper display 100 in accordance with one embodiment of the present invention. The system 300A includes the electronic paper display 100, a video transcoder 304, a display controller 308 and a waveforms module 310.

The video transcoder 304 receives a video stream 302 on signal line 312 for presentation on the display 100. The video transcoder 304 processes the video stream 302 and generates pixel data on signal line 314 that are provided to the display controller 308. The video transcoder 304 adapts and re-encodes the video stream for better display on the EPD 100. For example, the video transcoder 304 includes one or more of the following processes: encoding the video using the control signals instead of the desired image, encoding the video using simulation data, scaling and translating the video for contrast enhancement and reducing errors by using simulation feedback, past pixels and future pixels. More information regarding the functionality of the video transcoder 304 is provided below with reference to FIGS. 4-10.

The display controller 308 includes a host interface for receiving information such as pixel data. The display controller 308 also includes a processing unit, a data storage database, a power supply and a driver interface (not shown). In some embodiments, the display controller 308 includes a temperature sensor and a temperature conversion module. In some embodiments, a suitable controller used in some electronic paper displays is one manufactured by E Ink Corporation. In one embodiment, the display controller 308 is coupled to signal line 314 to transfer the data for the video frame. The signal line 314 may also be used to transfer a notification to display controller 308 that video frame is updated, or a notification of what the video frame rate is, so that display controller 308 updates the screen accordingly. The display controller 308 is also coupled by a signal line 316 to the video transcoder 304. This channel updates the look up tables 404 (as will be described below with reference to FIG. 4) in real time if necessary. For example if a user provides real-time feedback or the room temperature changes, or if there is a way to measure the displayed gray level accuracy, the display controller 308 may update the look up table 404 in real time using this signal line 316.

The waveforms module 310 stores the waveforms to be used during video display on the electronic paper display 100. In some embodiments, each waveform includes five frames, in which each frame takes a twenty millisecond (ms) time slice and the voltage amplitude is constant for all frames. The voltage amplitude is either 15 volts (V), 0V or −115V. In some embodiments, 256 frames is the maximum number of frames that can be stored for a particular display controller.

Figure 3B:
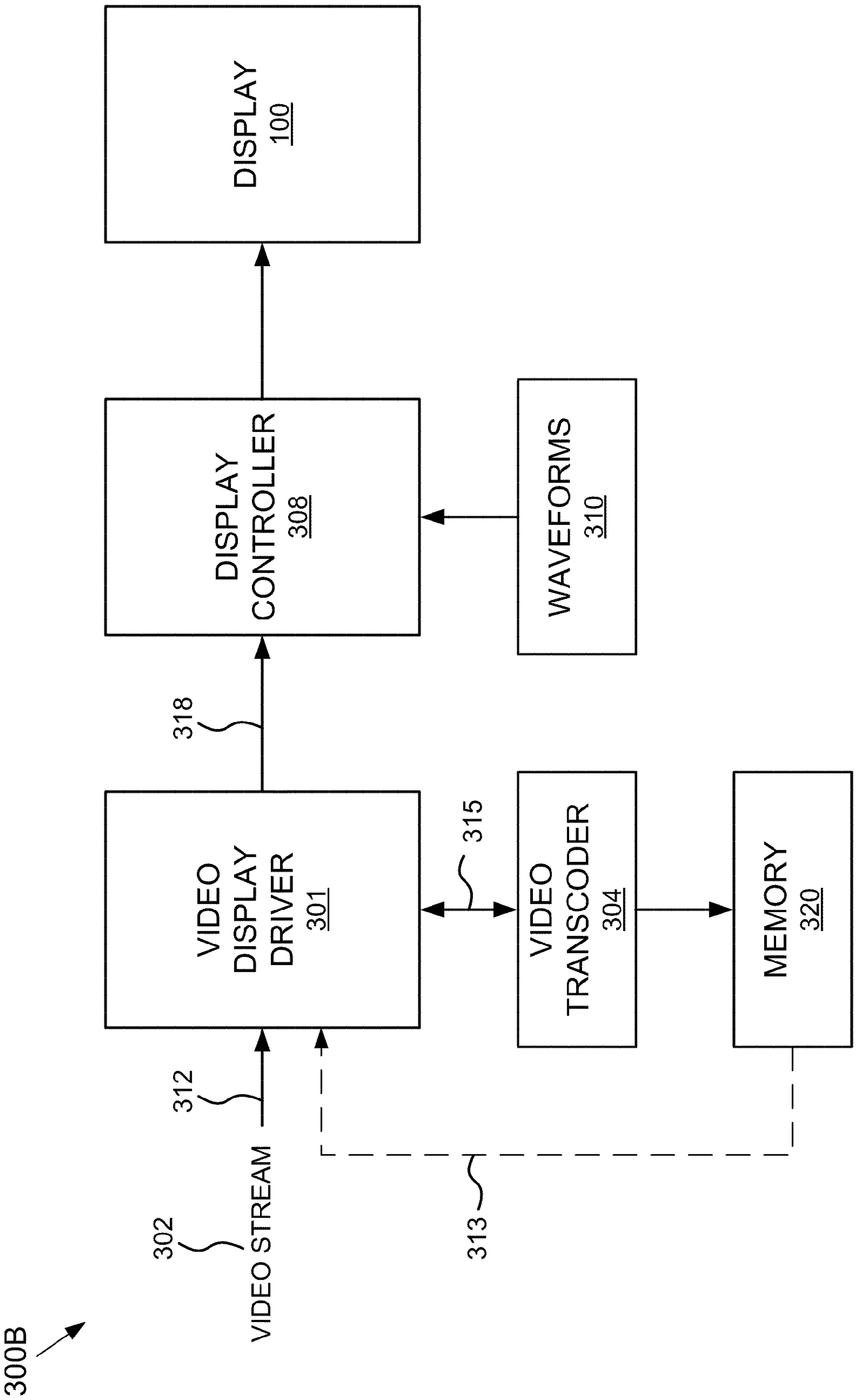
FIG. 3B shows a block diagram of a control system of the electronic paper display in accordance with another embodiment of the present invention.

FIG. 3B shows a block diagram of another embodiment of a control system 300B of the electronic paper display in accordance with the present invention. The system 300B includes the electronic paper display 100, a video display driver 301, a video transcoder 304, a display controller 308, a memory buffer 320, and a waveforms module 310.

The video display driver 301 receives a video stream 302 on signal line 312 for presentation on the display 100. In another embodiment, the video display driver 301 receives a re-formatted video stream, which has been processed by the video transcoder 304, from memory buffer 320. As previously mentioned, more information regarding the processing performed by the video transcoder 304 is provided below with reference to FIGS. 4-10. The video display driver 301 directs the video transcoder 304 to process the video stream 302 and generate pixel data. The video display driver 301 also directs the loading of waveforms into the frame buffer 1104 (FIG. 11) and the repeated updating of display commands to activate the display controller 308 until the end of the video playback. More information regarding the functionality of the video display driver 301 is provided below with reference to FIGS. 11-13.

As explained in above, the video transcoder 304 processes the video stream 302 as directed by the video display driver 301 and generates pixel data that is provided to the display controller 308. The video transcoder 304 adapts and re-encodes the video stream for better display on the EPD 100. For example, the video transcoder 304 includes one or more of the following processes: encoding the video using the control signals instead of the desired image, encoding the video using simulation data, scaling and translating the video for contrast enhancement and reducing errors by using simulation feedback, past pixels and future pixels. More information regarding the functionality of the video transcoder 304 is provided below with reference to FIGS. 4-10.

The display controller 308 includes a host interface for receiving information such as pixel data. The display controller 308 also includes a processing unit, a data storage database, a power supply and a driver interface (not shown). In some embodiments, a suitable controller used in some electronic paper displays is one manufactured by E Ink Corporation. Similar to the display controller 308 in FIG. 3A, the display controller 308 in FIG. 3B is coupled to signal line 318 to transfer the data for the video frame. In this embodiment shown in FIG. 3B, the display controller 308 does not include a second signal line 316 to the video transcoder 304 that may be used for updates to the look up tables 404 or feedback from the display controller 308.

The waveforms module 310 stores the waveforms to be used during video display on the electronic paper display 100. In some embodiments, each waveform includes five frames, in which each frame takes a twenty millisecond (ms) time slice and the voltage amplitude is constant for all frames. The voltage amplitude is either 15 volts (V), 0V or −15V. In some embodiments, 256 frames is the maximum number of frames that can be stored for a particular display controller.

Video Transcoder 304

The video transcoder 304 can be implemented in many ways to implement the functionality described below with reference to FIGS. 4-10. For example in one embodiment, it is a software process executable by a processor (not shown) and/or a firmware application. The process and/or firmware is configured to operate on a general purpose microprocessor or controller, a field programmable gate array (FPGA), an application specific integrated circuit (ASIC) or a combination thereof. Alternatively, the video transcoder 304 comprises a processor configured to process data describing events and may comprise various computing architectures including a complex instruction set computer (CISC) architecture, a reduced instruction set computer (RISC) architecture or an architecture implementing a combination of instruction sets. The video transcoder 304 can comprise a single processor or multiple processors. Alternatively, the video transcoder 304 comprises multiple software or firmware processes running on a general purpose computer hardware device.

Those skilled in the art will recognize that in one embodiment the video transcoder 304 and its components process the input video stream 302 in real time so that data can be output to the display controller 308 for generation of an output on display 100. However, in an alternate embodiment, the output of the video transcoder 304 may be stored in a storage device or memory 320 for later use. In such an embodiment, the video transcoder 304 acts as a transcoder to pre-process the video stream 302. This has the advantage of using other computational resources than those used for generation of the display which in turn allows greater quality prior to display.

Figure 4:
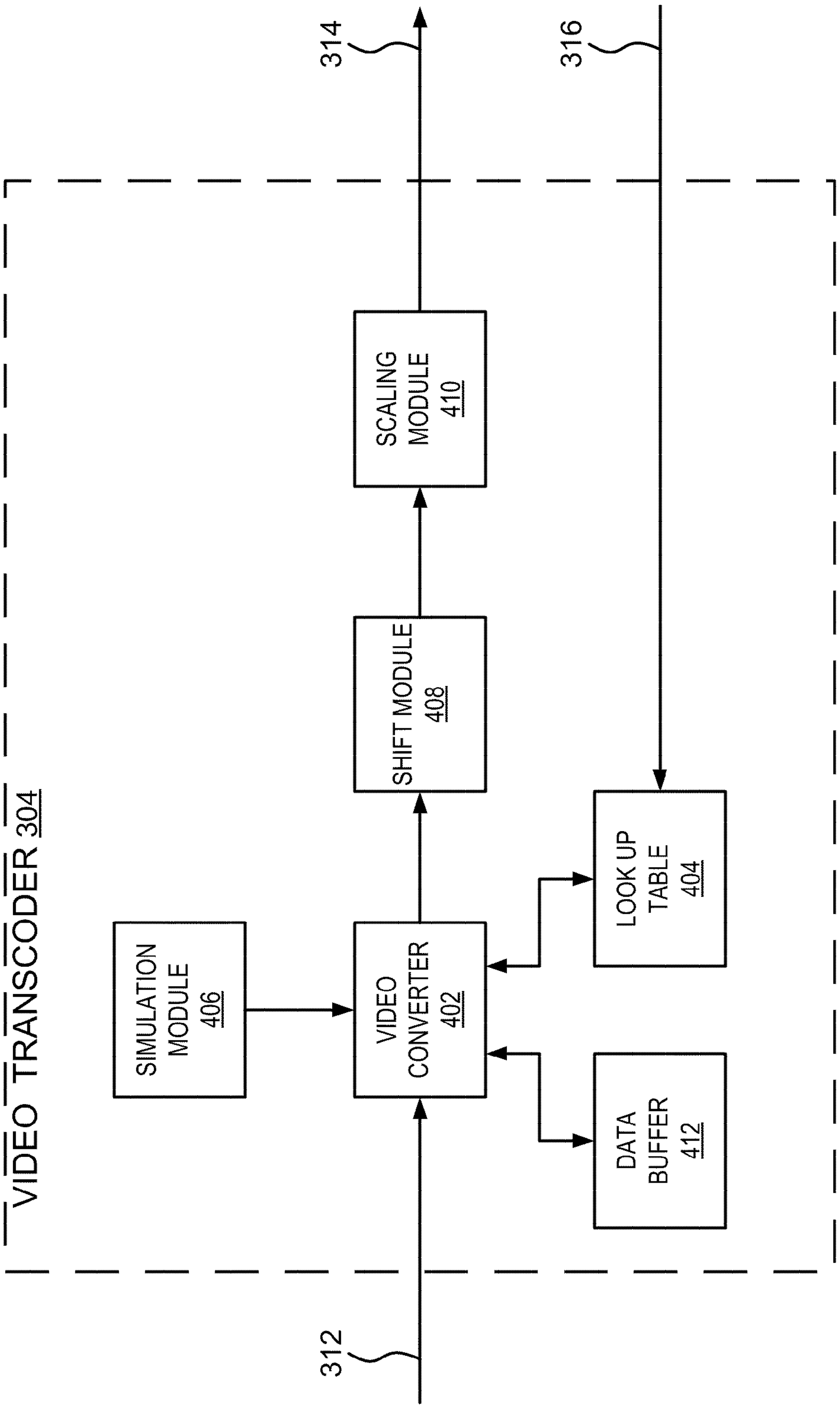
FIG. 4 shows a block diagram of a video transcoder in accordance with one embodiment of the present invention.

Referring now to FIG. 4, an embodiment of the video transcoder 304 is shown. The video transcoder 304 comprises a video converter 402, a lookup table 404, a simulation module 406, a shift module 408, a scaling module 410 and a data buffer 412. For purposes of illustration, FIG. 4 shows the video converter 402, the lookup table 404, the simulation module 406, the shift module 408, the scaling module 410 and the data buffer 412 as discrete modules. However, in various embodiments, the video converter 402, the lookup table 404, the simulation module 406, the shift module 408, the scaling module 410 and data buffer 412 can be combined in any number of ways. This allows a single module to perform the functions of one or more of the above-described modules.

The video converter 402 has inputs and outputs and is adapted to receive the video stream 302 on signal line 312 from any video source (not shown). The video converter 402 adapts and re-encodes the video stream 302 to take into account the difference in display speed and characteristics of the electronic paper display 100. The video converter 402 is also coupled for communication with the lookup table 404 and the simulation module 406 to reduce video playback artifacts as will be described in more detail below. The video converter 402 is able to generate video images on the electronic paper display 100 by using pulses instead of long waveforms, by re-encoding the video to reduce or eliminate visible video artifacts, and by using feedback error based on a model of the display characteristics. These functions performed by the video converter 402 are discussed in turn below. The video converter 402 advantageously uses shorter durations of voltage in order to achieve high video frame rate.

The lookup table 404 is coupled to the video converter 402 to receive the video stream 302, store it and provide voltage levels to be applied to pixels. In one embodiment, the lookup table 404 comprises a volatile storage device such as dynamic random access memory (DRAM), static random access memory (SRAM) or another suitable memory device. In another embodiment, the lookup table 404 comprises a non-volatile storage device, such as a hard disk drive, a flash memory device or other persistent storage device. In yet another embodiment, the lookup table 404 comprises a combination of a non-volatile storage device and a volatile storage device. The interaction of the lookup table 404 and the video converter 402 is described below.

The simulation module 406 is also coupled to the video converter 402 to provide simulation data. In one embodiment, the simulation module 406 can be a volatile storage device, a non-volatile storage device or a combination of both. The simulation module 406 provides data about the display characteristics of the display 100. In one embodiment, the simulation module 406 provides simulated data representing the display characteristics of the display 100. For example, the simulated data includes reconstructed or simulated values for individual pixels. Depending on the frame rate, there may not be enough time to apply a voltage level to get a pixel to transition from its current to state to the desired state. Thus, the pixel value ends up at an inaccurate level of gray. This inaccurate level of gray is referred here as a simulated or reconstructed value or frame. The simulation module 406 provides such simulated or reconstructed values are used by the video converter 402 to improve the overall quality of the output generated by the display 100. The simulation module 406 also provides estimated error introduced in transition a pixel from one state to another. Thus, the simulated information can be used to encode the video to maximize the quality of the video, as well as be used to reduce or eliminate error.

A significant challenge with displaying video sequences on the display 100 is the time required to modify value of a pixel. This time is a function of the desired gray level and the previous gray levels of the pixel. The video converter 402 of the present invention sets a desired video frame rate, R, and only allows M number of voltage frames to be applied to a pixel to change its value. For example, M equals 1000 ms divided by R multiplied by VT, where VT is the duration of one voltage frame. In one embodiment, VT=20 ms for the display 100, thus, in order to obtain a video frame rate of 12.5 fps, the number of voltage frames to be applied to change the value of a pixel is M=4. If a video clip has N video frames $\{f_0, f_1 \ldots f_N\}$. Transition from frame $f_{n-1}$ to frame $f_n$ is performed by applying different voltage levels in M number of voltage frames. With an example electrophoretic display, only one of three voltage levels {0, −15, and 15} can be applied in a voltage frame. The lookup table 404 is used to determine what voltage levels to apply in M voltage frames for a pixel level to go from value $p_{n-1}(x, y)$ to $p_n(x, y)$, where $p_n(x, y)$ is an element in the frame $f_n$, x and y are the coordinates of the pixel $p_n$ in the frame $f_n$, and $f_n$ is the current video frame. The output of the lookup table is a voltage vector, $\vec{V}_n=\{V_1, V_2, \ldots, VM\}$.

Limiting the number of voltage frames to M results in less accurate gray levels for individual pixels, simply because sometimes there is not enough time to apply voltage long enough to set the pixel to a desired gray level, $p_n(x, y)$. Therefore, the $p_n(x, y) \epsilon \{f_1 \ldots fn \ldots f_N\}$ are inaccurately constructed as $p^*_n(x, y) \epsilon \{f^*_1 \ldots f^*_n \ldots f^*_N\}$. The video converter 402 advantageously computes the required voltage levels to set the display 100 to a new frame based on the pixels of the reconstructed video frames, $f^*_{n-i}$, instead of the pixels of previous video frames $f_{n-i}$.

Figure 5:
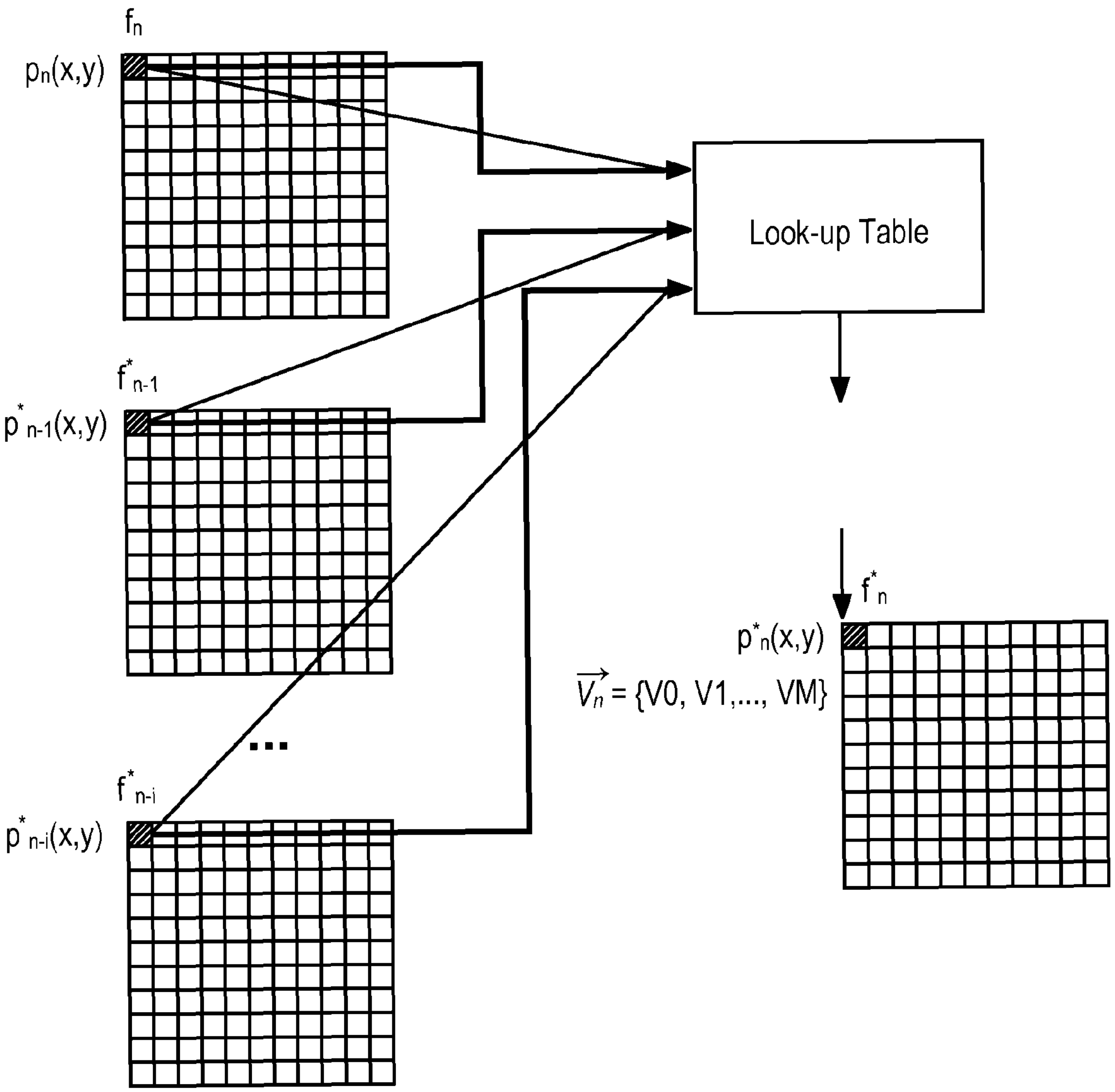
FIG. 5 shows a diagram of a lookup table that takes gray level values of the current pixel and previously reconstructed gray level values for video frames in accordance with one embodiment of the present invention.

The lookup table 404 can be arbitrarily complex as illustrated in FIG. 5. FIG. 5 illustrate the lookup table 404 that takes gray level values of the current pixel and previously reconstructed gray level values for 1 video frames. In one embodiment, a simple lookup table 404, LT, is indexed by the previous pixel value as follows: $p^*_n(x, y)=LT\ (p_n(x, y), p^*_{n-1}(x, y))$. In another embodiment, a more complex look up table 404 is indexed by the desired value of the pixel, $p_n(x, y)$, and the reconstructed values of the pixels belonging to the previous video frames, $p^*_{n-1}(x, y), \ldots, p^*_{n-i}(x, y)$ as follows: $p^*_n(x, y)=LT(p_n(x, y), p^*_{n-1}(x, y), \ldots, p^*_{n-i}(x, y))$. In yet another embodiment, the lookup table 404 is indexed with the desired pixel value, a starting pixel value, and the voltages applied during the last i video frames $p^*_n(x, y)=LT(p_n(x, y), p^*_{n-i}(x, y), \vec{V}_{n-1}, \ldots, \vec{V}_{n-i})$ where $\vec{V}_n$ is the voltage vector applied at nth video frame.

The data buffer 412 is coupled to the video converter 402 to receive the video data, store it and provide video data. In one embodiment, the data buffer 412 comprises a volatile storage device such as dynamic random access memory (DRAM), static random access memory (SRAM) or another suitable memory device. In another embodiment, the data buffer 412 comprises a non-volatile storage device, such as a hard disk drive, a flash memory device or other persistent storage device. In yet another embodiment, the data buffer 412 comprises a combination of a non-volatile storage device and a volatile storage device. The data buffer 412 is used to store previously constructed frames and future frames. The interaction of the data buffer 412 with the other components is described below.

Figure 6:
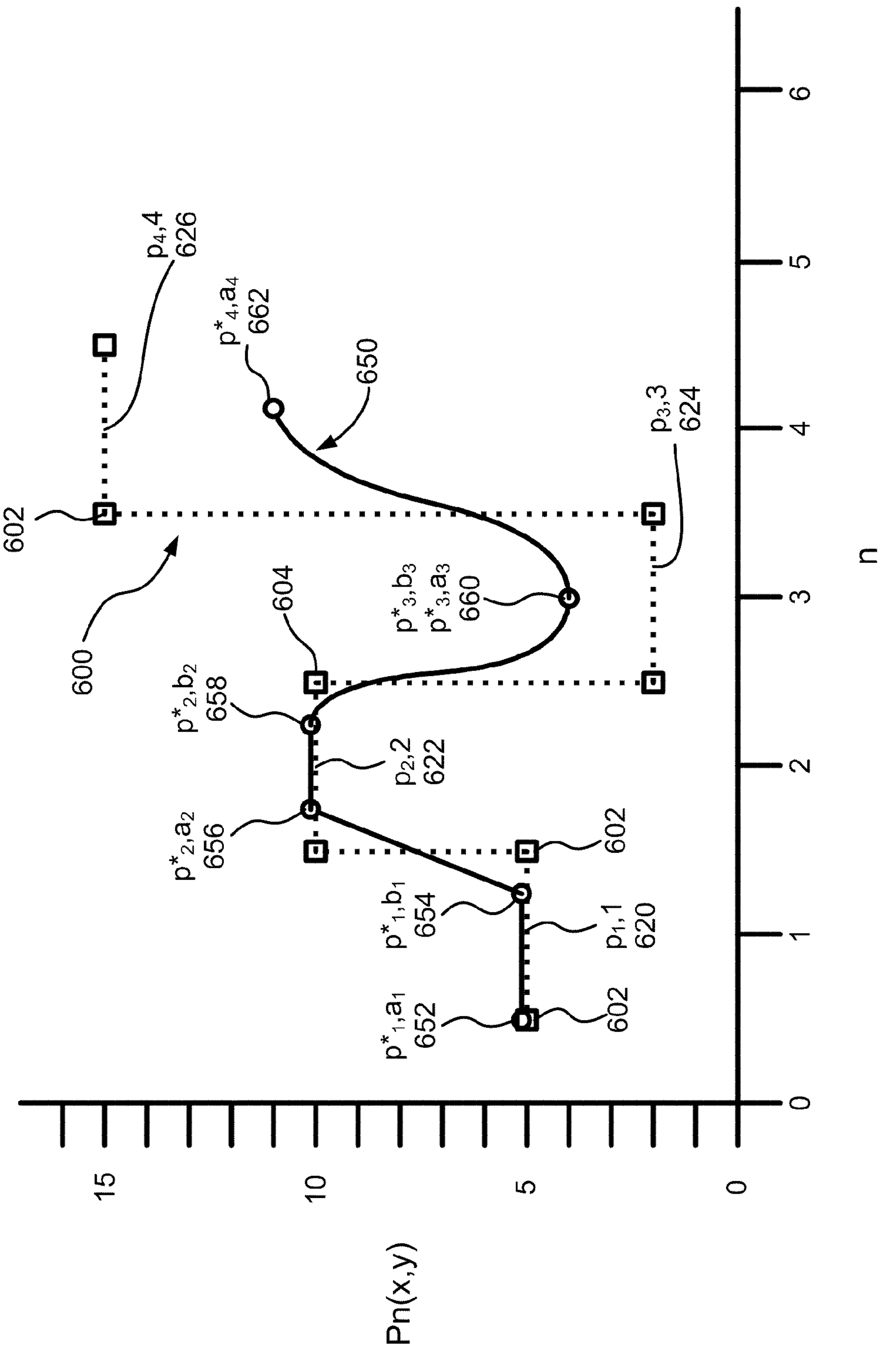
FIG. 6 shows a diagram of the output of the prior art as compared to the output of the video transcoder minimizing the error using future pixels in accordance with one embodiment of the present invention.

Referring now also to FIG. 6, the operation of the video converter 402 is described in more detail with reference to an example display and desired pixel values. In one embodiment, the video converter 402 uses the values of previously constructed frames and future frames from the data buffer 412 when determining what voltage levels to apply. In this example, it is assumed that the dynamic range of a pixel gray level is [0, 15]; the number of voltage frames between two video frames is M=3; and that applying +15V increases the gray level value by one, −15V decreases by 1 and 0V does not change the value. Further, assuming the display 100 is all black (i.e. all p are set to 0) and the desired pixel values at (x=0, y=0) for 4 video frames are: $p_0(0,0)=1$; $p_1(0,0)=4$; $p_2(0,0)=0$; and $p_3(0,0)=9$. Using the previous values of the pixel when determining voltage levels to be applied, the voltage vectors to achieve these levels would be:

| N | Target value | Applied voltage | Achieved value |
|---|---|---|---|
| n = 0 | $p_0(0, 0) = 1$ | $\vec{V}_0 = \{+15, 0, 0\}$ | $p^*_0(0, 0) = 1$ |
| n = 1 | $p_1(0, 0) = 4$ | $\vec{V}_1 = \{+15, +15, +15\}$ | $p^*_1(0, 0) = 4$ |
| n = 2 | $p_2(0, 0) = 0$ | $\vec{V}_2 = \{-15, -15, -15\}$ | $p^*_2(0, 0) = 1$ |
| n = 3 | $p_3(0, 0) = 9$ | $\vec{V}_3 = \{+15, +15, +15\}$ | $p^*_3(0, 0) = 4$ |

Instead, if we look ahead and also consider the future values of $p_n(x, y)$ when deciding on the voltage level, the overall error between $p_n(x, y)$ and the achieved values $p^*_n(x, y)$ may be smaller. For example, in the above table, when n=2, if we considered that in the next video frame $p^*_3(0,0)=9$, instead of $\vec{V}_2=\{-15,-15,-15\}$, $\vec{V}_2=\{-15,-15,+15\}$ can be applied, bringing the value of $p^*_2(0,0)$ to 2 and then back to 3. After $\vec{V}_3=\{+15,+15,+15\}$ is applied, $p^*_3(0,0)=6$ is achieved, which is much closer to the target value of $p_3(0,0)=9$. The method of the present invention can be seen as trying to fit a polynomial curve to the desired gray levels for each pixel. Those skilled in the art will recognize that curve fitting can be done using many techniques in the literature such as cubic spline, Bezier curves etc. The new target values for pixels can be determined from the polynomial fit. When performing curve fitting, there are range limitations on the $1^{st}$ derivative of each point such that the points on the curve are achievable given the number of voltage frames M. In other words, the polynomial should not be too steep at any point. If the polynomial is too steep, low pass filtering can be done for global or local smoothing.

In another embodiment, the voltage vector is determined based on the previously constructed pixel values, $p^*_{n-1}(x, y), \ldots, p^*_{n-i}(x, y)$; current pixel values, $p_n(x, y)$; and future pixel values, $p_{n+1}(x, y), \ldots, p_{n+m}(x, y)$ as shown in FIG. 6. In FIG. 6, the dashed line 602 and square points 604 show the desired pixel levels, $p_n$, and the solid line 650 and round points 652, 654, 656, 658, 660 and 662 show the modified target levels, $p^*_n$, given a limited number of voltage frames, M=4, that are applied between each video frame. For each desired pixel value and video frame number pair, i.e. ($p_n$, n), there is modified target pixel value, $p^*_n$, and the time, $a_n$, that the pixel takes the value; and a time, $b_n$, when the pixel leaves this value.

In one embodiment, an achievable new target path is set that minimizes the error in pixel values ($p^*_n - p_n$), minimizes the rise and fall times ($a_n - b_{n-1}$) and the first derivative of the path never exceeds the achievable level ($|p_n - p^*_{n-1}| <= M$). This can be described mathematically as:

$$\text{Minimize } |p^*_n - p_n| \tag{1}$$

$$\text{Minimize } a_n - b_{n-1} \tag{2}$$

$$\text{With achievability condition } |p_n - p^*_{n-1}| <= M \tag{3}$$

$$\text{and boundary conditions } b_n \geq a_n, a_n \geq n - 0.5, b_n \leq n + 0.5 \tag{4}$$

If it is desired that the achieved value of $p^*_n$ is always reached at n, then instead of (4), boundary conditions can be set as $$n \geq a_n \geq n - 0.5 \text{ and } n \leq b_n \leq n + 0.5$$

Combining (1) and (2) and optimizing all the video frames, N, we obtain the following optimization problem:

$$\text{Minimize} \sum_{n=0}^{N-1} \alpha |p^*_n - p_n| + \beta(a_n - b_{n-1}) \tag{5}$$

$$|p_n - p^*_{n-1}| <= M$$

$$b_n > a_n,\ a_n > n - 0.5,\ b_n < +0.5$$

The values of weights α and β determine the trade off between fast rise/fall and the accuracy of constructed pixel values. A relatively large α value guarantees that the pixel levels are achieved first, i.e. $p^*_n - p_n = 0$, before fall and rise times are optimized.

The optimization of equation (5) assumes that a pixel changing from one value to another can be computed from a derivative and a single threshold value. In reality, the amount of change achievable in pixel values is based on many other parameters. For example, the achievable change is greater in the middle ranges of gray values compared to around the limits of the gray values, as will be described in more detail below with reference to FIG. 7. Therefore, the condition (3) can be obtained from a look up table (Achievable[index]) as well and the problem (5) can be reformulated more generally as:

$$\text{Minimize} \sum_{n=0}^{N-1} \alpha |p^*_n - p_n| + \beta(a_n - b_{n-1}) \tag{6}$$

With condition Achievable[$p_n$, $p^*_{n-1}$, M]=true $$b_n \geq a_n, a_n \geq n - 0.5, b_n \leq n + 0.5$$

Since it may computationally intensive to solve this optimization problem for all the video frames together from 0 to N, in one embodiment, optimization can be done in on few video frames at a time or can be done with pre-processing.

In yet another embodiment, relative values of neighboring pixels can also be taken into consideration. For example, let's say two neighboring pixels $p_n(x, y)$ and $p_n(x, y+1)$ has the same desired value at video frames n−1 and n: $p_{n-1}(x, y)=0$ and $p_n(x, y)=5$; and $p_{n-1}(x, y+1)=0$ and $p_n(x, y+1)=5$. If after optimization the new target values are $p^*_n(x, y)=3$ and $p^*_n(x, y+1)=5$ this may not be desirable since neighboring pixels $p^*_n(x, y)$ and $p^*_n(x, y+1)$ end up at different gray levels. This problem can be addressed by including additional spatial constraints to the optimization problem that forces the neighboring pixels to have similar errors:

$$\text{Minimize} \sum_{n=0}^{N-1} \alpha|p_n^* - p_n| + \beta(a_n - b_{n-1}) \tag{7}$$

With condition Achievable[$p_n$, $p^*_{n-1}$,M]=true $b_n \geq a_n, a_n \geq n-0.5, b_n \leq n+0.5$ for each i=−I to +I and for each j=−J to +J $|p^*_n(x,y)-p_n(x,y)| \leq \delta |p^*_n(x+i,y+j)-p_n(x+i,y+j)|$ When δ equals 1 all the neighboring pixels are forced to have the same amount of error.

Thus, the video converter 302 in one embodiment processes the input video sequence by re-encoding them to reduce or eliminate visible video artifacts based on (1) desired value, (2) a previous pixel value, (3) a reconstructed value of pixel (simulation data) or achievable pixel value, (4) future value of pixels, (5) spatial constraints, and (6) minimizing error and rise and fall times.

In one embodiment, the present invention also includes a method for eliminating accumulating errors. Changing the value of a pixel only incrementally results in accumulation of errors on paper like displays. The video transcoder 304 eliminates these errors by occasionally driving pixels to the limits of gray level values, e.g., 0 and 15. If the value of a pixel is already at these levels, extra voltage can be applied to further force the pixels to these limits. For example, if a pixel at $p_{n-1}$=0 and $p_n$=0, normally one would apply $\vec{V}_n$={0,0,0} to go from n−1 to n. However, there is a benefit in applying $\vec{V}_n$={−15,−15,−15} to reduce the errors. In other words, the video transcoder 304 occasionally over drives to the pixel limits to ensure that pixel value is at zero without any error. It can be harmful for the display 100 if such voltage levels are continuously applied. So the encoder 304 includes a counter for each pixel that is set to determine the time of last frame update when the pixel was driven to a limit. As long as the threshold is above a predefined amount an extra voltage can be applied.

Figure 7:
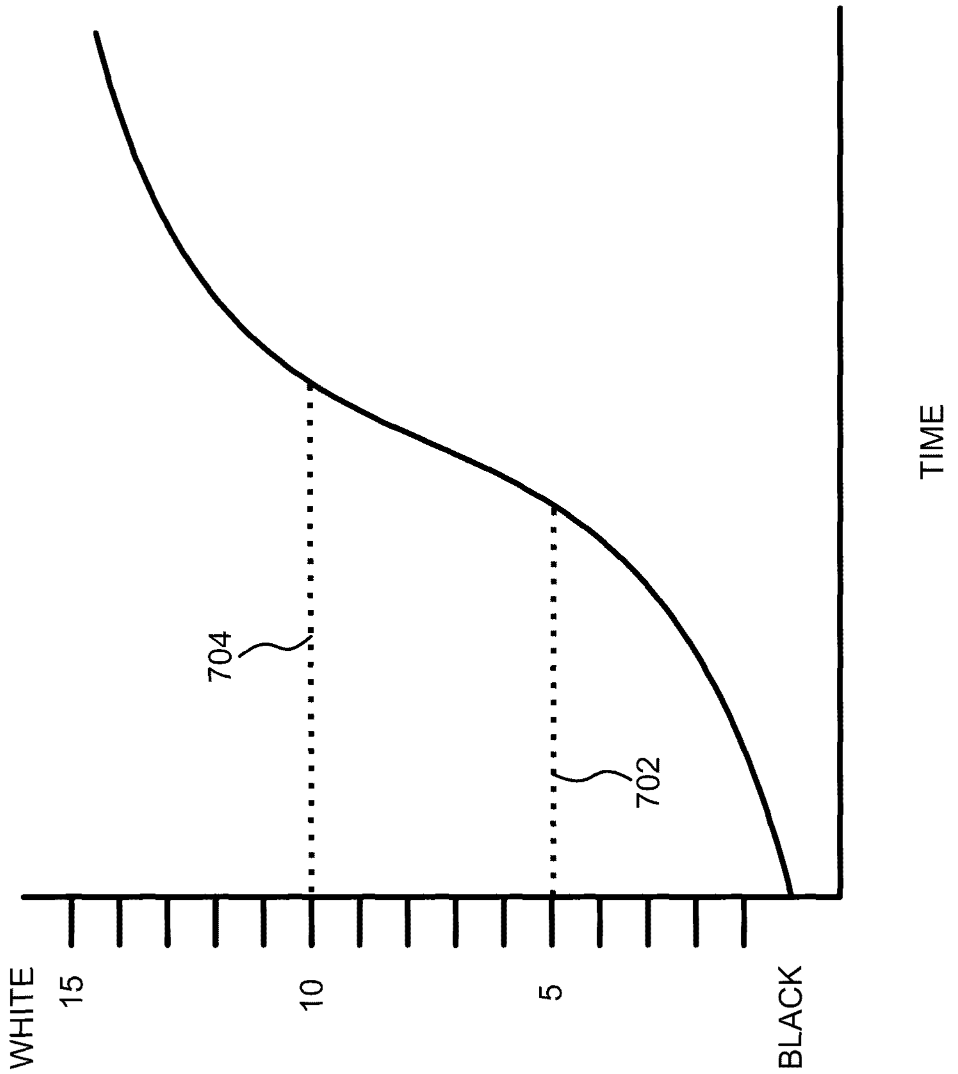
FIG. 7 shows a diagram of the rate of achievable change for pixel of an example electronic paper display in accordance with one embodiment of the present invention.

Referring now to FIG. 7, a graph of the display characteristics for an example electronic paper display is shown. The graph illustrates the achievable change as a function of time as a pixel in the display transition from one gray level to another. As can be seen, the curve is steepest in the range or region from a gray level of 5 designated by dashed line 702 to a gray level of 10 designated by dashed line 704. In other words, the achievable change is greater in the middle ranges of gray values from 5 to 10 as compared to around the limits of the gray values (below 4 and above 10). Additionally, the human eye is more sensitive to change in pixel gray levels than the exact gray level at which the pixel settles. This means that setting a pixel value from 11 to 15 is slower than changing the pixel value from 6 to 10, even though the change of gray levels is equal to 4 in both cases. Therefore, if there is a video sequence with a lot of dark pixel values or light pixel values and lots of motion, the present invention advantageously modifies the pixel values to new target values such that the pixels values are closer to the middle of the dynamic range.

Figure 8:
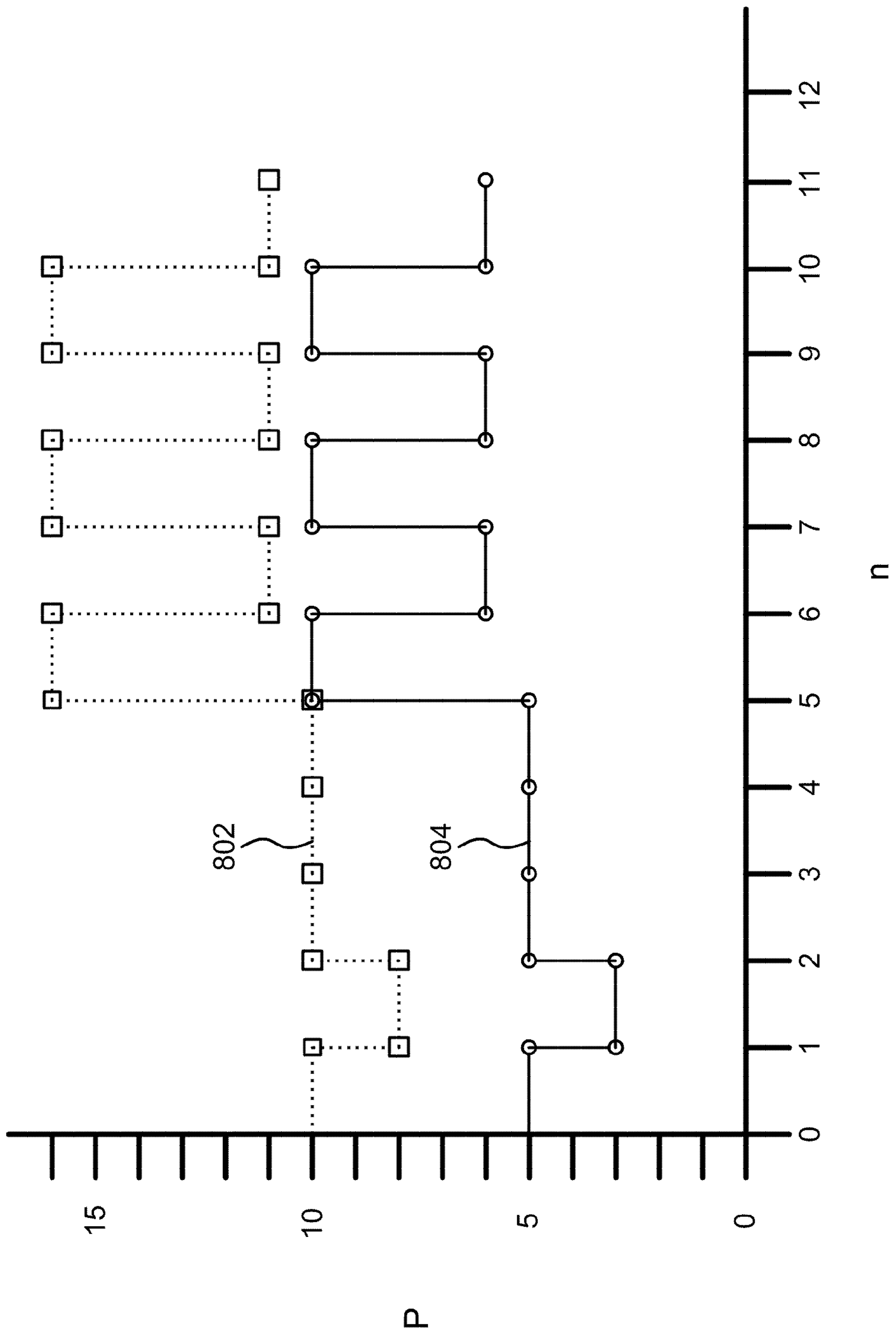
FIG. 8 illustrates a diagram of the output of the prior art as compared to the output of the video transcoder shifted to enhance contrast in accordance with one embodiment of the present invention.

Referring now also to FIG. 8, the shift module 408 will be described in more detail. In one embodiment, the shift module 408 is coupled to the output of the video converter 402 and provides its output to the scaling module 410. In another embodiment, the shift module 408 is part of the video converter 402. The shift module 408 is software or routines for adjusting the desired gray level of pixels to improve their visual quality by changing their desired pixel level such that it is in the region of greater achievable change. For example, for a display with the characteristic of FIG. 7 that may mean moving desired pixel values up or down so that they are mostly in the range of gray levels 5 to 10. However, relative gray levels of pixels are preserved, but overall the image output may be slightly darker or lighter because the shift module 410 has shifted the desired pixel values so that the transitions between successive frames are more achievable. FIG. 8 shows a specific example of a change in original pixel values $p_n$(x, y) as represented by dashed line 802 and square points. The display 100 has pixel value dynamic range of zero to 15. A lot of change or transition in the pixel values occurs after n=5th video frame and the range of pixel values change from 11 to 15. Such pixels values are processed by the shift module 408 to produce the shifted pixel values $p^*_n$(x, y) as represented by solid line 804 and circle points. The display of the shifted pixel values of $p^*_n$ are obtained by reducing the original pixel values by 5 gray levels ($p^*_n = p_{n-\rho}$, ρ=5). These transitions between gray levels are achievable faster than the original pixel values, $p_n$. Each frame in video sequence would be darker but this may not be noticeable by the user or may be more desirable compared to a slow video frame rate.

Figure 9:
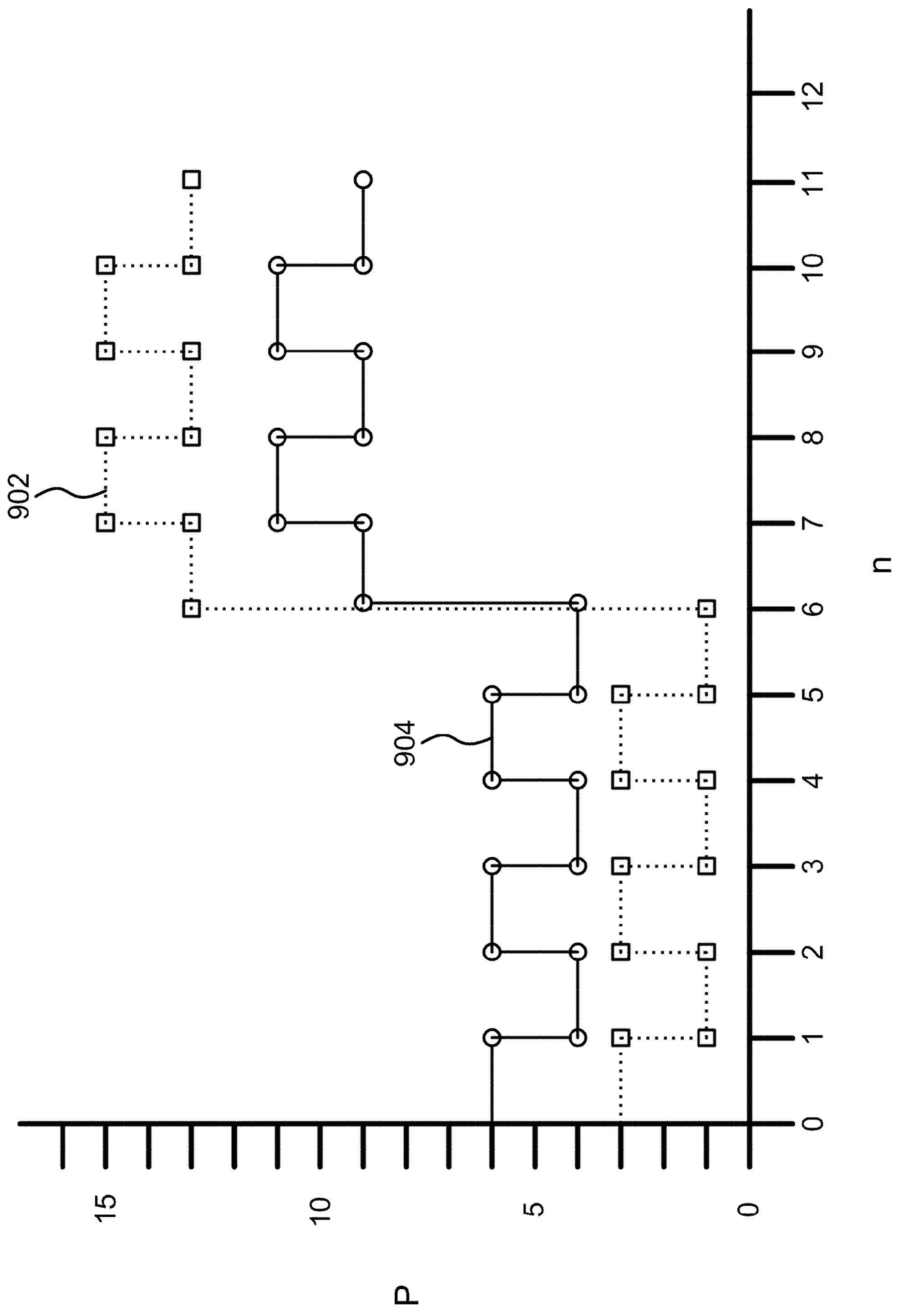
FIG. 9 shows a diagram of the output of the prior art as compared to the output of the video transcoder scaled to enhance contrast in accordance with one embodiment of the present invention.

Referring now also to FIG. 9, the scaling module 410 is described in more detail. In one embodiment, the scaling module 410 is coupled to the output of the shift module 408 and its output is coupled by signal line 314 display controller 308. In another embodiment, the scaling module 410 is coupled to the output of the video converter 402. In yet another embodiment, the functionality of the scaling module 410 is included as part of the shift module 408 or the video converter 402. The scaling module 410 is software or routines for adjusting the desired gray level of pixels to improve their visual quality by changing their desired pixel level such that it is in the region of greater achievable change. FIG. 9 illustrates original pixel values, $p_n$(x, y), as represented by dashed line 902 and square points. The scaling module 410 modifies the original pixel values, $p_n$(x, y), to move them into a range where pixel gray levels can be modified faster. The output of the scaling module 410 is shown by solid line 804 and circle points of scaled pixel values, $p^*_n$, where pixels n=0 to n=6 are moved up three gray levels and pixels n=6 to n=11 are moved down four gray levels. FIG. 9 illustrates how different amounts of scaling may be applied by the scaling module 410 to different portions of the original pixel values.

The shifting module 408 and the scaling module 410 also include a candidate module for detecting which portions of a video sequence are candidates for shifting and/or scaling. A good candidate video clip for such dynamic range shifting and/or reduction would be a video clip where most of its motion intense regions are close to the dynamic range borders. In particular, this candidate module determines if and how much dynamic range shifting/reduction are necessary. The candidate module first computes how many pixels, $S_h$, require transitions from one gray level, h, to the other and the average amount of change, $D_h$, (the number of gray levels). For example, if a pixel is set from 14 to 15 and another pixel is set from 13 to 15, $S_{15}$=2 transitions are done for gray level 15 with the amount of $D_{15}$=(1+2)/2=3/2 average gray level changes. More specifically:

$$S_h = \sum_{n=0}^{N} \sum_{x=0}^{X} \sum_{y=0}^{Y} S(h, p_n, p_{n-1}),$$

where $$S(h, p_n, p_{n-1}) = \begin{cases} 1 & p_n = h \text{ and } p_{n-1} \neq h \\ 0 & \text{otherwise} \end{cases}$$

-continued $$D_h = \frac{1}{S_h}\sum_{n=0}^{N}\sum_{x=0}^{X}\sum_{y=0}^{Y}D(h, p_n, p_{n-1}),$$

where $$D(h, p_n, p_{n-1}) = \begin{cases} |p_n - p_{n-1}| & p_n = h \\ 0 & \text{otherwise} \end{cases}$$

The examples and formulations given here are for an entire video sequence of N frames and the entire region of X by Y in each frame. These formulations can be easily altered to be applied for subsets of the video frames and sub-regions of each frame. When doing so, the transitions of dynamic ranges either between frames or in a frame needs to be taken into account as well.

Once the candidate module computes $S_h$ and $D_h$ for each gray level, each of these offer different information: For example, if $S_h$ has a small value for gray level h and $D_h$ has a large value (note that dynamic range of $S_h$ and $D_h$ are different and their values should be considered in their dynamic range not relative to each other), then this means not many pixels have gray level h, but then a pixel is set to h, the displacement of gray values were high. In contrast, if $S_h$ has a large value and $D_h$ has a small value, this means many pixels are set to h but displacement of gray values are small and more quickly displayable on the display 100.

The candidate module processes the values of $S_h$ and $D_h$ individually or collectively ($S_h$*$D_h$,$S_h$+$D_h$, etc.) to identify which h value the most motion intensive pixels cluster around. And that the pixel values $p_n$ in the whole video sequence can be shifted by ρ and or multiplied by σ. The shift amount p and multiplication amount ρ can be determined in such a way that the shifting and scaling guarantees a minimum dynamic range $R_{min}$ when scaling and shifting the most motion intense gray levels to mid gray regions.

Video Display Driver

Figure 11:
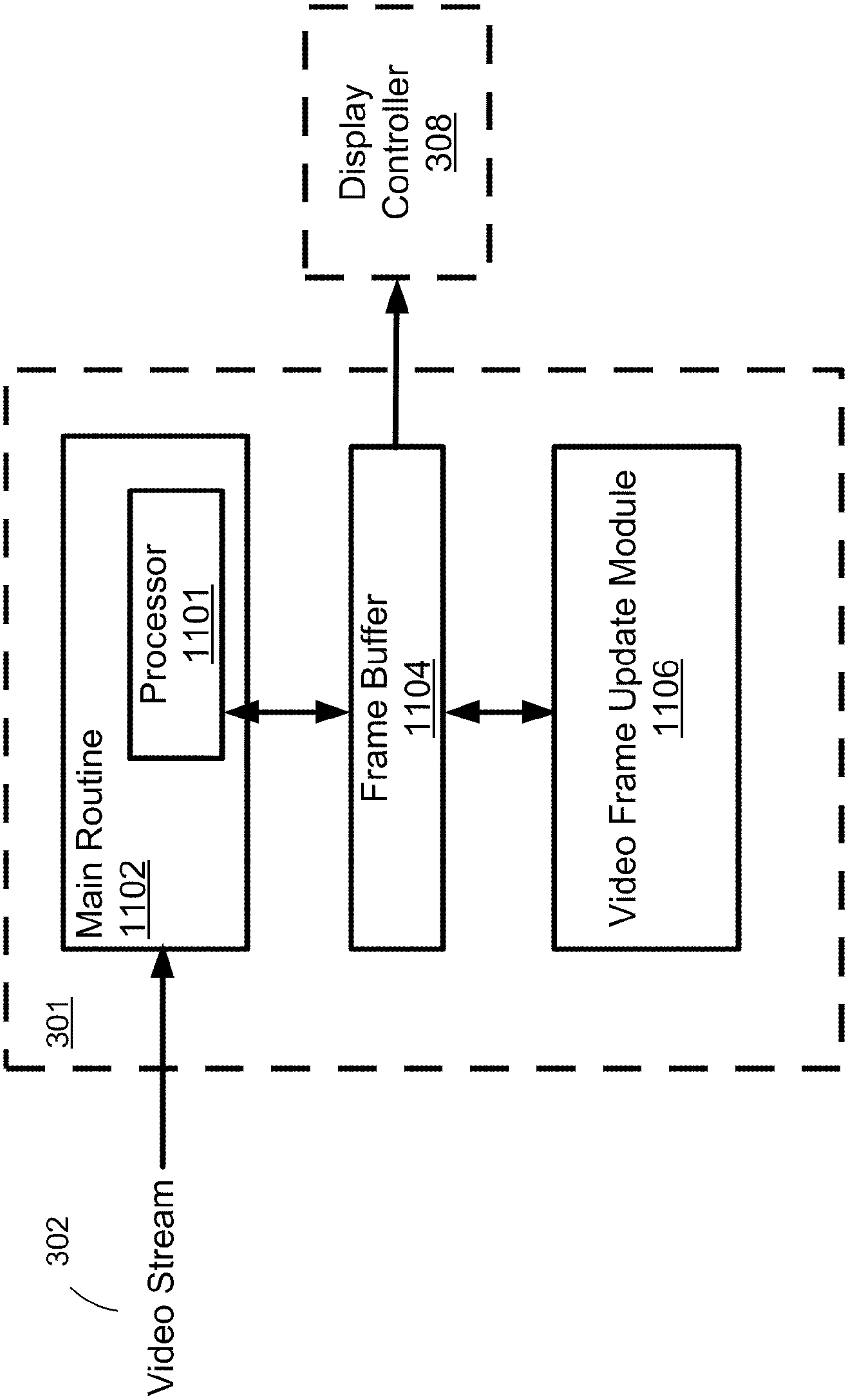
FIG. 11 shows a block diagram of a video display driver in accordance with one embodiment of the present invention.

FIG. 11 is a block diagram illustrating the architecture of a video display driver 301 in accordance with one embodiment of the present invention. The video display driver 301 includes a main routine control module 1102, a frame buffer 1104, and a video frame update module 1106. In some embodiments, the frame buffer 1104 is included in the display controller 308.

The video display driver 301 receives a video stream 302 on signal line 312 for presentation on the display 100. In one embodiment, the video display driver 301 receives a re-formatted video stream, which has been processed by the video transcoder 304, from memory buffer 320. The main routine control module 1102 of the video display driver 301 directs the video transcoder 304 to process the video stream 302 and generate pixel data. The main routine control module 1102 of the video display driver 301 also directs the loading of waveforms into the frame buffer 1104 (FIG. 11), and the repeated updating of display commands to activate the display controller 308.

The main routine control module 1102 of the video display driver 301 initiates the process performed by the video transcoder 304. The main routine control module 1102 includes a processor 1101. The processor 1101 can be any general-purpose processor for implementing a number of processing tasks. Generally, the processor 1101 is coupled to the display controller 308 and processes data received by the main routine control module 1102. The main routine control module 1102 also loads of waveforms into the frame buffer 1104 and updates display commands repeatedly to activate the display controller 308 until the end of the video playback. More details describing the steps performed in the main routine control module 1102 are described below with reference to FIG. 12.

The frame buffer 1104 receives data from the video frame update module 1106 and stores information to be used by the display controller 308. The frame buffer 1104 contains pixel data that is used by the display controller 308. In one embodiment, as shown in this FIG. 11, the frame buffer 1104 is included in the video display driver 301. In another embodiment (not shown), the frame buffer 1104 is included in the display controller 308.

The video frame update module 1106 of the video display driver is initiated by the main routine control module 1102 and controls the process for copying video frames one by one from the memory buffer 320 to the frame buffer 1102 in real time during the video playback. Details describing the steps performed in this process of the video frame update module 1106 are described below with reference to FIG. 13.

In one embodiment, the main routine control module 1102, frame buffer 1104 and video frame update module 1106 are three separate modules containing software routines and are adapted for communication with the display controller 308. In another embodiment, the main routine control module 1102, frame buffer 1104 and video frame update module 1106 are hardware devices operating on the EPD 100.

Methods

Figure 10:
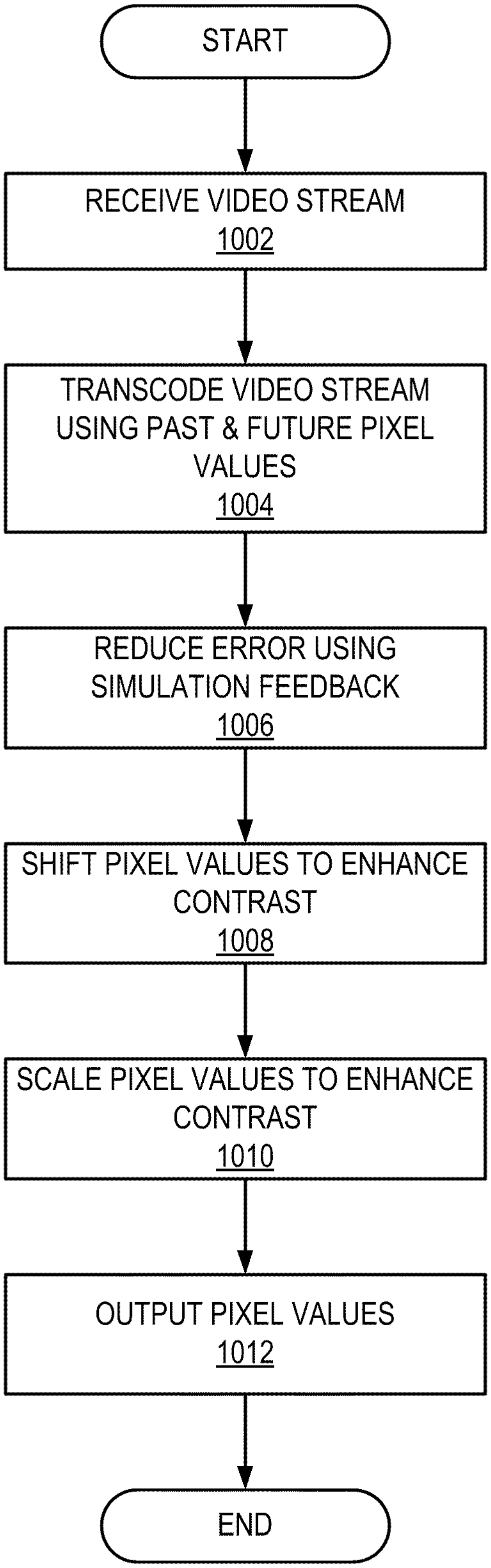
FIG. 10 is a flowchart illustrating a method performed by a video transcoder according to one embodiment of the present invention.
Figure 12:
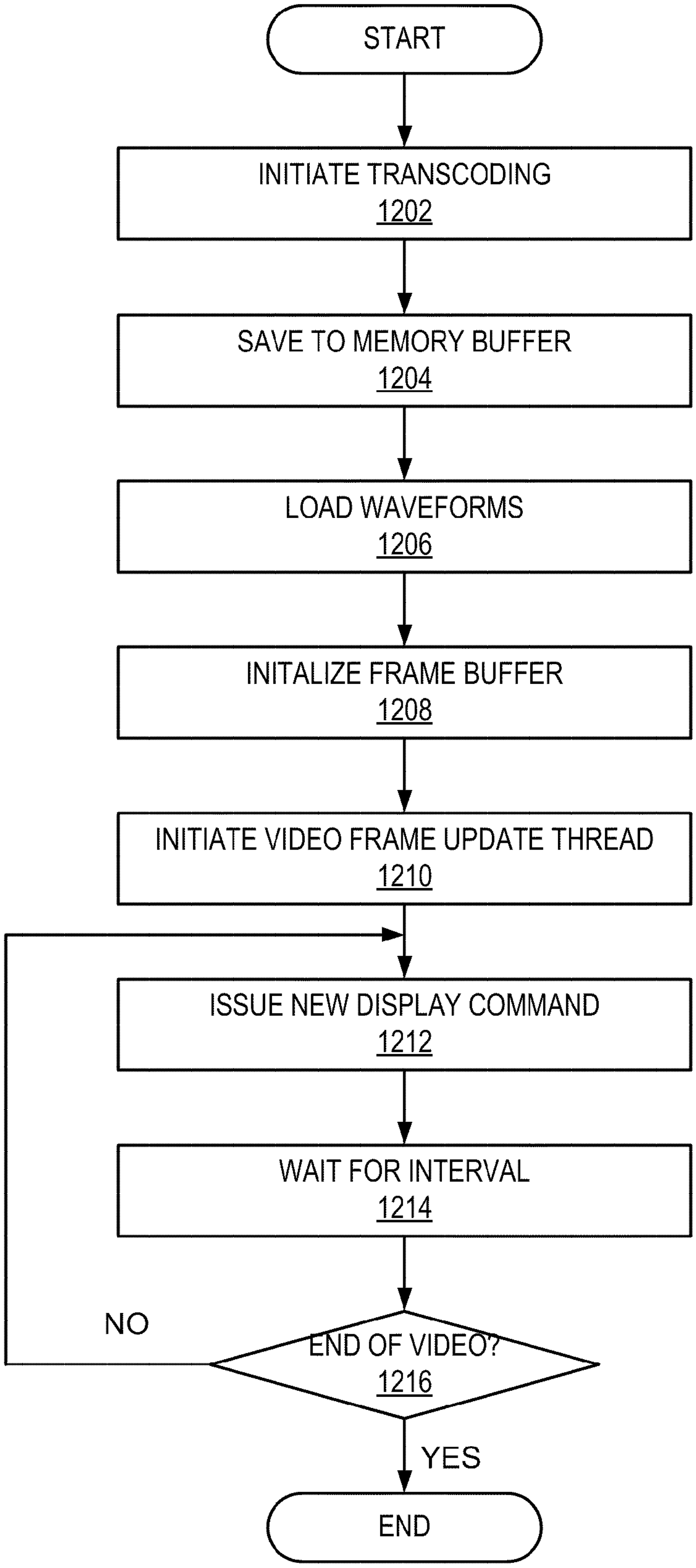
FIG. 12 is a flowchart illustrating a method performed by a main routine control module of the video display driver in accordance with one embodiment of the present invention.
Figure 13:
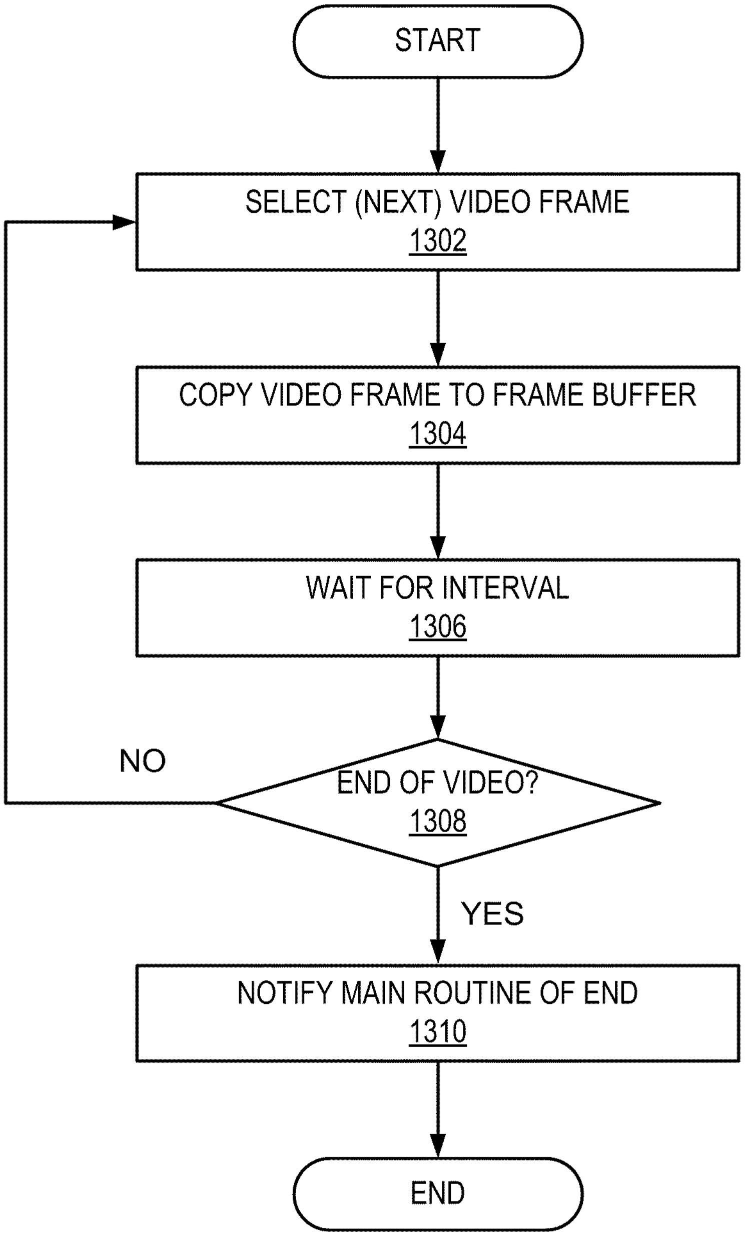
FIG. 13 is a flowchart illustrating a method performed by a video frame update module of the video display driver in accordance with one embodiment of the present invention.

Referring now to FIGS. 10, 12 and 13, an embodiment of the methods involved in displaying video on an electronic paper display will be described. FIG. 10 is a flowchart illustrating a method performed by a video transcoder according to one embodiment of the present invention. The method begins by receiving 1002 a video stream. Next, the method transcodes 1004 the video stream using past and future pixel values. For example, this can be done by the video converter 402 as has been described above. Then, the method reduces 1006 the error using simulation feedback. This simulation feedback is provided by the simulation module 406 in one embodiment. The method uses the reconstructed pixel values in encoding to minimize the error. Next, the method shifts 1008 the pixel values to enhance the contrast. In one embodiment, the shift module 408 processes the pixel value to move them into the range of greater achievable change. Next, the method scales 1010 the pixel values to move them into the range of greater achievable change. In one embodiment, this performs as has been described above by the scaling module 410. After the pixels have been processed they are output 1012 and directed to the display 100 via the video display driver 301. Those skilled in the art will recognize that these steps may be performed in various orders other than that shown in FIG. 10. It should be further understood that one or more steps may be omitted without departing from the spirit of the claimed invention.

FIG. 12 is a flowchart illustrating a method performed by the main routine control module 1102 of the video display driver 301 in accordance with one embodiment of the present invention. The method begins by initiating 1202 the transcoding of a received video stream. The steps involved in the transcoding were described in detail above with reference to FIG. 10. The output from the video transcoder 304 is saved 1204 to the memory buffer 320 for later use. The waveforms are then loaded 1206 in the frame buffer 1104. The waveforms are designed with maximum length of time duration for each gray level transition. Each waveform includes either positive voltage impulses or negative with uniformity inserted zero voltages in between. The number of inserted zeroes depends on the voltage impulses required by the gray level transition. For example, for the transition from black to dark gray, the zero voltages inserted in between the positive voltages are more in frequency than the transition from black to light gray.

The frame buffer 1104 is then initialized 1208 by resetting the frame buffer 1104 to a blank image. The video frame update module 1106 is then initiated 1210. The details of the steps involved are described below with reference to FIG. 13. A new display command is issued 1212 repeatedly to activate the display controller 308 until the end of the video playback. Once a new display command is issued, the method waits 1214 for a predetermined amount of time, which is typically the length of time duration of the waveforms. A determination is made 1216 as to whether the process has reached the end of the video and if it has reached the end (1216—Yes), the process ends. If it has not reached the end (1216—No), the method continues to issue 1212 another display command to the display controller 308.

FIG. 13 is a flowchart illustrating a method performed by the video frame update module 1106 of the video display driver 301 in accordance with one embodiment of the present invention. The method of the video frame update module 1106 is initiated by the main routine control module 1102 and runs concurrently with the main routine control module 1102. The method repeatedly copies each video frame, one by one, to the frame buffer 1104 until the end of the video. Upon initiation, the first video frame is selected 1302 and copied 1304 from the memory buffer to the frame buffer 1104. The method waits 1306 for a predetermined amount of time, which is the inverse of the video frame rate. This value may be included in the re-formatted video data, or simply predefined in the system settings. If the end of the video has been reached (1308-Yes), the method notifies the main routine control module 1102 and the process ends. If the end of the video has not been reached (1308—No), the next frame is selected 1302 and copied to the frame buffer 1104. The method continues until the end of the video has been reached.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for displaying video on an electronic paper display, the method comprising:

receiving a video stream of original pixel values;

determining desired values for pixels of video data by shifting the original pixel values by a number of gray levels to a range where the desired values are modified faster and contrast is enhanced, wherein determining the desired values comprises:

computing how man pixels ($S_h$) are transitioning from a first gray level to a second gray level and an average amount of change ($D_h$);

processing the $S_h$ and the $D_h$ to identify the gray level around which a largest number of motion intensive pixels cluster; and determining the number of gray levels to achieve a minimum dynamic range and shifting intense gray levels to mid-gray levels;

determining future values for the pixels of video data;

processing the video stream using the desired values and the future values including adjusting the desired values and the future values to generate one or more control signals for the electronic paper display;

iteratively copying a current video frame from a memory buffer to a frame buffer; and applying the one or more control signals to the electronic paper display.

2. The method of claim 1, wherein determining the desired values for pixels further comprises scaling the original pixel values by the number of gray levels to the range where the desired values are modified faster.

3. The method of claim 1, wherein copying the current video frame from the memory buffer to the frame buffer is performed at a rate independent of an updating rate of the electronic paper display.

4. The method of claim 1 wherein processing the video stream further comprises adapting the video stream based at least in part on display speed and characteristics of the electronic paper display.

5. The method of claim 1, wherein processing the video stream further comprises minimizing an error between the desired values for the pixels and achievable values for the pixels using the future values of the pixels.

6. The method of claim 1, further comprising generating a display command at a predetermined time interval for updating the electronic paper display, the predetermined time interval being a length of time duration of a waveform.

7. The method of claim 1, further comprising scaling the intense gray levels to the mid-gray levels.

8. A system for displaying video on an electronic paper display, the system comprising:

the electronic paper display;

a video display driver adapted to receive a video stream of original pixel values;

a display controller having inputs and outputs, the display controller adapted to receive signals from the video display driver and apply one or more control signals to the electronic paper display, the outputs of the display controller coupled to the electronic paper display; and an encoder adapted to receive the signals from the video display driver and output the one or more control signals, the encoder adapted to determine desired values for pixels of video data by shifting the original pixel values by a number of gray levels to a range where the desired values are modified faster and contrast is enhanced, wherein determining the desired values comprises computing how many pixels ($S_h$) are transitioning from a first gray level to a second gray level and an average amount of change ($D_h$), processing the $S_h$ and the $D_h$ to identify the gray level around which a largest number of motion intensive pixels cluster, and determining the number of gray levels to achieve a minimum dynamic range and shifting intense gray levels to mid-gray levels, determine future values for the pixels of video data and process the desired values and the future values for the pixels of video data including adjusting the desired values and the future values to generate the one or more control signals, the encoder coupled to the input of the video display driver.

9. The system of claim 8, wherein determining the desired values for pixels further comprises scaling the original pixel values by the number of gray levels to the range where the desired values are modified faster.

10. The system of claim 8, further comprising a memory buffer for storing the video data and wherein the video display driver is adapted to receive the video data from the memory buffer.

11. The system of claim 9, wherein the video display driver is adapted to iteratively copy a current video frame from the memory buffer to a frame buffer and send the one or more control signals to the display controller.

12. The system of claim 11, wherein copying the current video frame from the memory buffer to the frame buffer is performed at a rate independent of an updating rate of the electronic paper display.

13. The system of claim 8, wherein the encoder generates the one or more control signals by minimizing an error between the desired values for the pixels and achievable values for the pixels using the future values of the pixels.

14. The system of claim 8, wherein the video display driver generates a display command at a predetermined time interval for updating the electronic paper display, the predetermined time interval being a length of time duration of a waveform.

15. The system of claim 8, wherein the encoder scales the intense gray levels to the mid-gray levels.

16. A computer program product comprising a non-transitory computer useable medium including a computer readable program, wherein the computer readable program when executed on a computer causes the computer to:

receive a video stream of original pixel values;

determine desired values for pixels of video data by shifting the original pixel values by a number of gray levels to a range where the desired values are modified faster and contrast is enhanced, wherein determining the desired values comprises:

computing how many pixels ($S_h$) are transitioning from a first gray level to a second gray level and an average amount of change ($D_h$);

processing the $S_h$ and the $D_h$ to identify the gray level around which a largest number of motion intensive pixels cluster; and determining the number of gray levels to achieve a minimum dynamic range and shifting intense gray levels to mid-gray levels;

determine future values for the pixels of video data;

process the video stream using the desired values and the future values including adjusting the desired values and the future values to generate one or more control signals for an electronic paper display;

iteratively copy a current video frame from a memory buffer to a frame buffer; and apply the one or more control signals to the electronic paper display.

17. The computer program product of claim 16 wherein the computer readable program when executed on the computer further causes the computer to process the video stream by minimizing an error between the desired values for the pixels and achievable values for the pixels using the future values of the pixels.

18. The computer program product of claim 16 wherein the computer readable program when executed on the computer further causes the computer to generate a display command at a predetermined time interval for updating the electronic paper display, the predetermined time interval being a length of time duration of a waveform.

19. The computer program product of claim 16 wherein the computer readable program when executed on the computer further causes the computer to scale the intense gray levels to the mid-gray levels.

20. The computer program product of claim 16, wherein the computer readable program when executed on the computer further causes the computer to scale the original pixel values by the number of gray levels to the range where the desired values are modified faster.

* * * * *